United States Patent
Wilding

(10) Patent No.: US 10,628,643 B2
(45) Date of Patent: Apr. 21, 2020

(54) VEHICLE IMMOBILIZER

(71) Applicant: Griffen Security, LLC, Boca Raton, FL (US)

(72) Inventor: Gavin Wilding, Lenham Maidstone (GB)

(73) Assignee: Griffen Security LLC, Boca Raton, FL (US)

( * ) Notice: Subject to any disclaimer, the term of this patent is extended or adjusted under 35 U.S.C. 154(b) by 0 days.

(21) Appl. No.: 16/130,519

(22) Filed: Sep. 13, 2018

(65) Prior Publication Data

US 2019/0095662 A1 Mar. 28, 2019

Related U.S. Application Data

(60) Provisional application No. 62/564,747, filed on Sep. 28, 2017.

(51) Int. Cl.
*G06K 9/00* (2006.01)
*G06K 7/10* (2006.01)
(Continued)

(52) U.S. Cl.
CPC ....... *G06K 7/10366* (2013.01); *G06K 7/0008* (2013.01); *G06K 19/0723* (2013.01); *H04W 4/80* (2018.02); *B60R 25/04* (2013.01)

(58) Field of Classification Search
None
See application file for complete search history.

(56) References Cited

U.S. PATENT DOCUMENTS 5,382,948 A * 1/1995 Richmond .............. B60R 25/04
180/287
5,635,900 A 6/1997 Hasegawa et al.
(Continued)

FOREIGN PATENT DOCUMENTS

CN 101388120 A 3/2009
CN 102259636 A 11/2011
(Continued)

OTHER PUBLICATIONS

International Search Report and Written Opinion of the International Searching Authority received from the Korean Patent Office in related Application No. PCT/US2018/052383 dated Jan. 16, 2019.

*Primary Examiner* — K. Wong
(74) *Attorney, Agent, or Firm* — The Marbury Law Group, PLLC

(57) ABSTRACT

A vehicle security system includes a main printed circuit board (PCB) assembly, a radio frequency identification (RFID) assembly, a starter assembly, and an RFID tag. The main PCB assembly may be configured to determine whether an activation sequence of a motor vehicle is correct, whether an RFID tag is in close physical proximity to the RFID reader, and whether the RFID tag is a valid RFID tag. The main PCB assembly may transition the vehicle security system into a disarmed state to allow the starter assembly to start the motor vehicle in response to determining that the RFID tag is valid. The main PCB assembly may deactivate a critical component of the motor vehicle in response to determining that the activation sequence is not correct, that that the RFID tag is not in close physical proximity, or that that the RFID tag is not valid.

18 Claims, 14 Drawing Sheets

(51) Int. Cl.
*H04W 4/80* (2018.01)
*G06K 7/00* (2006.01)
*G06K 19/07* (2006.01)
*B60R 25/04* (2013.01)

(56) References Cited

U.S. PATENT DOCUMENTS

| | | | |
|---|---|---|---|
| 5,675,490 A | 10/1997 | Bachhuber | |
| 5,828,297 A * | 10/1998 | Banks | B60R 25/04 |
| | | | 340/426.12 |
| 6,144,112 A | 11/2000 | Gilmore | |
| 6,332,572 B1 * | 12/2001 | Yamamoto | B60R 25/2072 |
| | | | 235/382 |
| 6,356,186 B1 * | 3/2002 | Price | B60R 25/04 |
| | | | 180/287 |
| 6,573,615 B1 | 6/2003 | Asakura et al. | |
| 6,701,231 B1 * | 3/2004 | Borugian | B60R 25/04 |
| | | | 307/10.2 |
| 6,888,265 B2 | 5/2005 | Turner et al. | |
| 6,897,762 B2 * | 5/2005 | Howells | B60R 25/04 |
| | | | 340/12.5 |
| 6,898,489 B1 | 5/2005 | Hayes, Sr. | |
| 7,064,651 B2 | 6/2006 | Goetz | |
| 7,272,469 B2 * | 9/2007 | Kalau | B60R 25/04 |
| | | | 180/287 |
| 7,706,778 B2 * | 4/2010 | Lowe | H04L 63/062 |
| | | | 455/411 |
| 7,859,413 B2 | 12/2010 | Nguyen | |
| 8,571,725 B2 * | 10/2013 | Juzswik | B60R 25/245 |
| | | | 701/2 |
| 2006/0131959 A1 | 6/2006 | Nishijima et al. | |
| 2012/0306636 A1 | 12/2012 | Tieman et al. | |
| 2013/0063244 A1 | 3/2013 | Raed et al. | |
| 2015/0070135 A1 | 3/2015 | Ford | |

FOREIGN PATENT DOCUMENTS

| | | |
|---|---|---|
| DE | 43 17 114 A1 | 11/1994 |
| DE | 198 03 046 A1 | 8/1999 |
| DE | 103 37 424 A1 | 3/2005 |
| EP | 1 462 325 A2 | 9/2004 |
| KR | 10-0589010 B1 | 6/2006 |
| KR | 10-2010-0073586 A | 7/2010 |
| WO | 1993/005987 A1 | 4/1993 |

* cited by examiner

VEHICLE IMMOBILIZER

RELATED APPLICATIONS

This application claims the benefit of priority to U.S. Provisional Application No. 62/564,747 entitled "Vehicle Immobilizer" filed Sep. 28, 2017, the entire contents of which are incorporated herein by reference for all purposes.

BACKGROUND

Many motor vehicles have a mechanical key-in-ignition switch built into the ignition control module that may be used to help generate a variety of functions for the comfort, convenience and security of the driver and passengers of a vehicle. For example, the key-in-ignition switch may be used in combination with a door-open switch to initiate a warning signal to the driver if the key is left in the ignition switch when the driver's door is opened, as required by section 114 of the Federal Motor Vehicle Safety Standards (FMVSS 114). When the key is in the ignition switch, an electric signal generated by the key-in-ignition switch is sent to a microcontroller indicating the presence of the key in the ignition switch module. When the driver's door is opened, another switch, the driver's door ajar/jamb switch, changes state. This state change is also detected by the microcontroller. If the microcontroller still detects the presence of the ignition key, it will command a warning chime to be turned on to notify the driver that the key is still in the vehicle.

Some security systems utilize these features to control the vehicle's fuel pump. For example, a conventional security system may disable the vehicle's fuel pump based on the electric signals that are generated when the key is placed in the ignition switch. However, these conventional systems can be readily disabled as they only disable a single component or system of the vehicle and do not utilize a sequentially revolving code or highly secure communications to ensure that the electric signals are not captured and used by thieves to circumvent the security systems. For these and other reasons, conventional security systems do not adequately protect the motor vehicle from thieves and other malicious actors. Accordingly, improved automotive security solutions that better utilize secure communications and multi-point immobilization will be beneficial to consumers.

SUMMARY

Various embodiments include a vehicle security system that includes a main printed circuit board (PCB) assembly, a radio frequency identification (RFID) reader coupled to the main PCB assembly, a starter assembly coupled to the main PCB assembly, and an RFID tag configured to transmit a secret keycode message to the RFID reader. In various embodiments, the main PCB assembly is configured to determine whether an activation sequence of a motor vehicle is correct, determine whether the RFID tag is in close physical proximity to the RFID reader and whether the RFID tag is valid in response to determining that the activation sequence of the motor vehicle is correct, and transition the vehicle security system into a disarmed state to allow the starter assembly to start the motor vehicle in response to determining that the RFID tag is valid.

In various embodiments, the main PCB assembly may be further configured to immobilize the motor vehicle by deactivating a critical component of the motor vehicle. The main PCB assembly may be configured to immobilize the motor vehicle in response to determining that the activation sequence of the motor vehicle is not correct, that the RFID tag is not in close physical proximity or that the RFID tag is not valid. In some embodiments, the main PCB assembly may be configured to deactivate the critical component of the motor vehicle by deactivating a starter motor of the motor vehicle, and/or deactivating a fuel pump of the motor vehicle.

In some embodiments, the RFID tag may be configured to receive a passcode from the RFID reader, determine whether the received passcode matches a stored passcode, retrieve a keycode from a secure memory in response to determining that the received passcode matches the stored passcode, and send the retrieved keycode to the RFID reader.

In some embodiments, the main PCB assembly may be configured such that the operations of determining whether the RFID tag is in close physical proximity to the RFID reader and whether the RFID tag is valid include using a sequentially revolving code to select a random sub-section of a keycode stored in a local memory of the main PCB assembly, generating information identifying the selected random sub-section of the keycode, sending a passcode and the information identifying the selected random sub-section of the keycode to the RFID tag, receiving a keycode portion from the RFID tag in response to sending the passcode and the information identifying the selected random sub-section of the keycode to the RFID tag, determining whether the received keycode portion matches information stored in the selected random sub-section of the keycode, and determining that the RFID tag is valid in response to determining that the received keycode portion matches information stored in the selected random sub-section of the keycode. In these embodiments, the RFID tag may be configured to receive the passcode and the information identifying the selected random sub-section of the keycode, determine whether the received passcode matches a stored passcode, use the information identifying the selected random sub-section of the keycode to retrieve a keycode portion stored in a secure memory in response to determining that the received passcode matches the stored passcode, and send the retrieved keycode portion to the main PCB assembly via the RFID reader.

In some embodiments, the main PCB assembly may be configured such that the operations for determining whether the activation sequence of the motor vehicle is correct include monitoring sensors in the motor vehicle to determine whether an entry event occurred, and monitoring an ignition system of the motor vehicle to determine whether an ignition activation event occurred. In some embodiments, the main PCB assembly may be configured to monitor the ignition system of the motor vehicle to determine whether the ignition activation event occurred in response to determining that at least one entry event occurred. In some embodiments, the main PCB assembly may be configured to determine whether the RFID tag is in close physical proximity to the RFID reader in response to determining that the ignition activation event occurred.

In some embodiments, the main PCB assembly may be configured to determine that the activation sequence of the motor vehicle is correct by determining that at least one entry event occurred, determining that the ignition activation event occurred, and determining that at least one entry event occurred prior to the ignition activation event. In some embodiments, the main PCB assembly may be further configured to activate a defense mechanism or a deterrent in response to determining that the activation sequence of the motor vehicle is not correct.

In some embodiments, the main PCB assembly may be further configured to determine whether an ignition system of the motor vehicle transitioned from an on state to an off state, activate a timer in response to determining that the ignition system of the motor vehicle transitioned from the on state to the off state, determine whether a value of the timer is greater than a threshold value, and enter into an armed state in response to determining that the value of the timer is greater than the threshold value.

Further embodiments may include a vehicle security device that includes a processor that is configured with processor executable instructions to perform operations that may include determining whether an activation sequence of a motor vehicle is correct, determining whether an RFID tag is in close physical proximity to an RFID reader of the motor vehicle in response to determining that the activation sequence of the motor vehicle is correct, determining whether the RFID tag is valid, and transitioning into a disarmed state to allow a starter assembly of the motor vehicle to start the motor vehicle in response to determining that the RFID tag is valid.

In various embodiments, the processor may be configured such that the operations for determining whether the RFID tag is in close physical proximity to the RFID reader and/or determining whether the RFID tag is valid include using a sequentially revolving code to select a random sub-section of a keycode stored in a local memory of the vehicle security device, generating information identifying the selected random sub-section of the keycode, sending a passcode and the information identifying the selected random sub-section of the keycode to the RFID tag, receiving a keycode portion from the RFID tag in response to sending the passcode and the information identifying the selected random sub-section of the keycode to the RFID tag, determining whether the received keycode portion matches information stored in the selected random sub-section of the keycode, and determining that the RFID tag is valid in response to determining that the received keycode portion matches information stored in the selected random sub-section of the keycode.

In some embodiments, the processor may be configured such that the operations for determining whether the activation sequence of the motor vehicle is correct include monitoring outputs from sensors in the motor vehicle to determine whether an entry event occurred, and monitoring an ignition system of the motor vehicle to determine whether an ignition activation event occurred. In some embodiments, the processor may be configured to determine that the activation sequence of the motor vehicle is correct in response to determining that at least one entry event occurred, that the ignition activation event occurred, and that the at least one entry event occurred prior to the ignition activation event.

In some embodiments, the processor may be further configured to activate a defense mechanism or a deterrent in response to determining that the activation sequence of the motor vehicle is not correct. In some embodiments, the processor may be further configured to immobilize the motor vehicle by deactivating a critical component of the motor vehicle in response to determining that the activation sequence of the motor vehicle is not correct, determining that the RFID tag is not in close physical proximity, or determining that the RFID tag is not valid.

Further various embodiments may include methods of providing security for a motor vehicle, including determining, via a processor in a vehicle security system component, whether an activation sequence of the motor vehicle is correct, determining whether an RFID tag is in close physical proximity to an RFID reader of the motor vehicle in response to determining that the activation sequence of the motor vehicle is correct, determining whether the RFID tag is valid in response to determining that the RFID tag is in close physical proximity to the RFID reader, and allowing a starter assembly of the motor vehicle to start the motor vehicle in response to determining that the RFID tag is valid.

In various embodiments, the methods may include immobilizing the motor vehicle in response to determining that the activation sequence of the motor vehicle is not correct, determining that the RFID tag is not in close physical proximity, or determining that the RFID tag is not valid.

In some embodiments, the operations of determining whether the RFID tag is in close physical proximity to the RFID reader and determining whether the RFID tag is valid may include using a sequentially revolving code to select a random sub-section of a keycode stored in a local memory of the vehicle security system component, generating information identifying the selected random sub-section of the keycode, sending a passcode and the information identifying the selected random sub-section of the keycode to the RFID tag, receiving a keycode portion from the RFID tag in response to sending the passcode and the information identifying the selected random sub-section of the keycode to the RFID tag, determining whether the received keycode portion matches information stored in the selected random sub-section of the keycode, and determining that the RFID tag is valid in response to determining that the received keycode portion matches information stored in the selected random sub-section of the keycode.

In some embodiments, the methods may include receiving, via a RFID tag processor of the RFID tag, the passcode and the information identifying the selected random sub-section of the keycode, determining, via the RFID tag processor, whether the received passcode matches a stored passcode, using the information identifying the selected random sub-section of the keycode by the RFID tag processor to retrieve a keycode portion stored in a secure memory in response to determining that the received passcode matches the stored passcode, and sending the retrieved keycode portion from the RFID tag to the vehicle security system component.

Further embodiments may include a computing device or a vehicle security device having a processor configured with processor-executable instructions to perform the various operations summarized above.

Further embodiments may include a non-transitory processor-readable storage medium having stored thereon processor-executable instructions configured to cause a processor to perform various operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
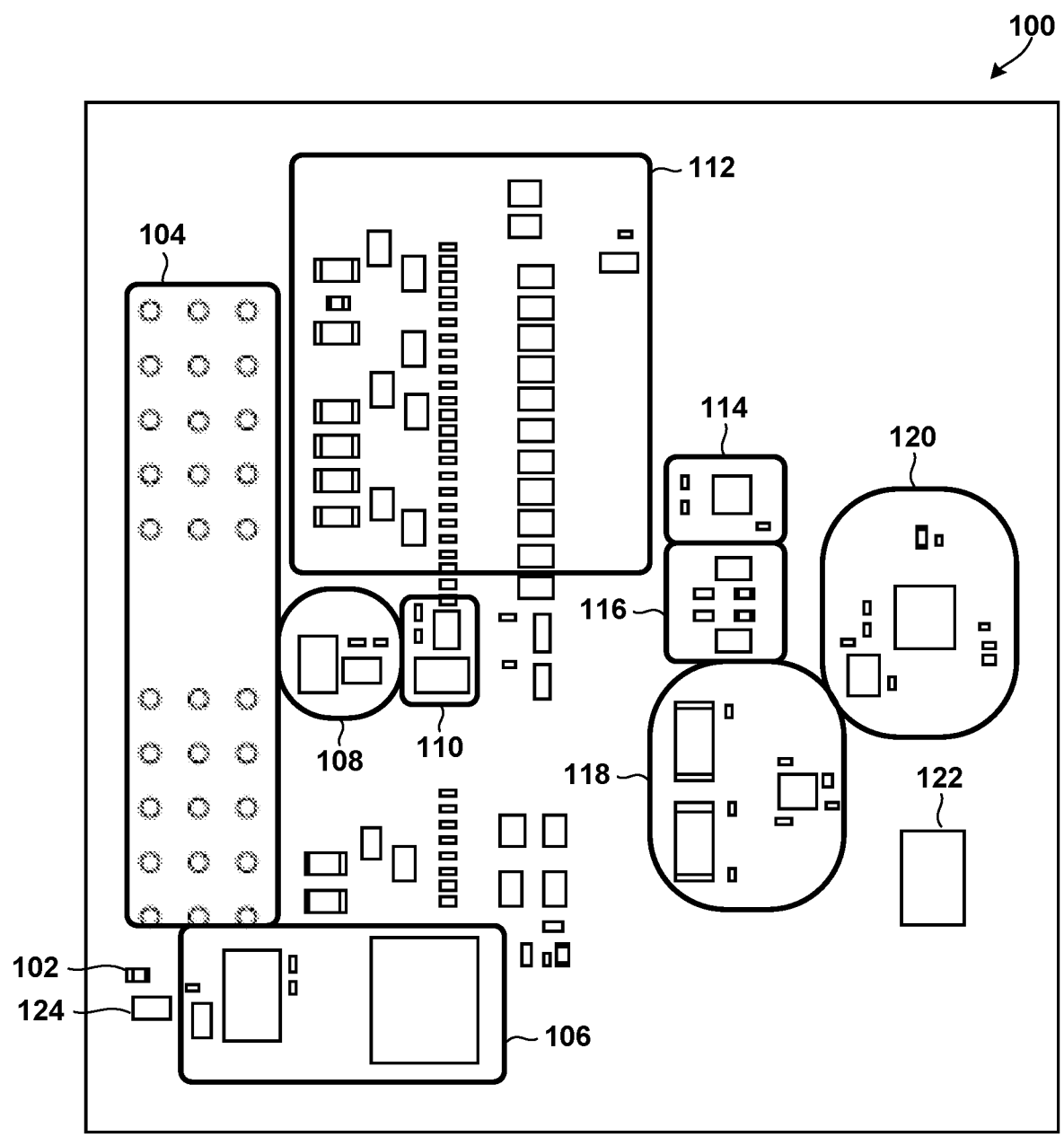
FIG. 1 is a block diagram illustrating components in a main printed circuit board (PCB) assembly of a vehicle security system that is configured to provide security for a motor vehicle and intelligently immobilize the motor vehicle in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include a vehicle security system and methods implemented in the vehicle security system for intelligently immobilizing a motor vehicle. In various embodiments, a motor vehicle may be equipped with a vehicle security system (vehicle immobilizer system), which may include a main printed circuit board (PCB) assembly, a starter board PCB assembly or an ignition security module/component, an RFID assembly (referred to herein as an RFID reader) or security code receiver, and a data input printed circuit board or an RFID tag.

The vehicle security device or a component in the vehicle security system (e.g., main PCB assembly, processor, etc.) may be configured to determine whether an activation sequence of a motor vehicle is correct, and determine whether an RFID tag is in close physical proximity to the RFID reader in response to determining that the activation sequence of the motor vehicle is correct. The vehicle security device or component may determine whether the RFID tag is valid, and transition the vehicle security system into a disarmed state to allow the starter assembly to start the motor vehicle in response to determining that the RFID tag is valid. The vehicle security device or component may also immobilize the motor vehicle (e.g., by deactivating a critical component of the motor vehicle, etc.) in response to determining that the activation sequence of the motor vehicle is not correct, that the RFID tag is not in close physical proximity to the RFID reader, or that an RFID tag that is in close physical proximity to the to the RFID reader is not a valid RFID tag (e.g., is not authorized, does not store the correct passkey, etc.).

The vehicle security system may integrate with critical components of the motor vehicle to control the vehicle's operation and/or activate or deactivate the vehicle's security or defense mechanisms. Critical components of the motor vehicle may include one or more of the vehicle's starter assembly/circuit, ignition system, ignition relay component, pump control unit, fuel pump, fuel pump relay component, battery, power supply, propulsion apparatus, motor vehicle engine, engine computer, engine control unit (ECU), engine computer power relay component, microcontroller, fuses and/or other similar components known in the art for activating, powering on or controlling a motor vehicle's operation.

In some embodiments, the vehicle security system may include an auto arming feature that automatically arms itself after a certain period after the vehicle's ignition system is turned off. For example, the vehicle security system may deactivate the vehicle's starter circuit and fuel pump thirty seconds after the ignition system is turned off. For example, in some embodiments the vehicle security system may start a timer in response to receiving a signal or otherwise determining that the ignition system of the vehicle transitioned from the on state to the off state, and deactivate the vehicle's starter circuit and fuel pump in response to determining that the timer expired for a countdown timer or that value of the timer exceeds a threshold value (e.g., timer value >30 seconds) for a count-up timer.

The vehicle security system may disarm itself after a user enters the motor vehicle and a valid key/RFID tag is read or detected in combination with usual actions of a vehicle's owner. For example, the vehicle security system may disarm itself in response to determining that an entry event occurred (e.g., the car door was recently opened and closed, etc.), an ignition activation event occurred (e.g., ignition was turned to the on position, etc.), an RFID tag was moved into close physical proximity to an RFID reader of the vehicle security system, and the RFID tag transmits a valid keycode in response to receiving a unique passcode transmitted by the system.

Disarming the vehicle security system will allow the user to start and operate the motor vehicle. In some embodiments, disarming the vehicle security system may include activating one or more critical components of the motor vehicle (e.g., the vehicle's starter circuit, fuel pump, etc.) to allow a user to start and operate the motor vehicle. In some embodiments, disarming the vehicle security system may include powering down the vehicle security system or preventing the vehicle security system from disabling a critical component of the motor vehicle for a period of time, until an external event is detected, or until the vehicle security system is rearmed.

In some embodiments, the vehicle security system may include an RFID reader that is configured to interrogate or search for a valid RFID tag only after the vehicle security system detects that a door input has triggered and/or that the ignition is turned to the on position. This may reduce power consumption and provide an added layer of security, as the reader will be undetected in any other situation. Thus, in some embodiments, if the door input has not been triggered, the vehicle security system will not search for a valid RFID tag. As such, if the vehicle security system detects that the door input has not been triggered and the ignition has turned to the on position, the vehicle security system may automatically activate a defense mechanism or a deterrent (e.g., activate the horn, turn off the fuel pump, etc.).

The starter board or an ignition security module may include a hardwired receiver (e.g., physical conductor, etc.) for receiving ignition state change signals. Alternatively or in addition, the starter board or an ignition security module may include a wireless receiver configured to send and receive signals and information, including ignition state change signals. The ignition state change signals may identify a change in ignition state between the on state and the off state, or vice versa. The ignition security module may also be configured to read ignition state change signals from the RFID component. In some embodiments, the ignition security module may include—or may be—the vehicle's starter assembly/circuit.

The vehicle security system may be configured to provide security for the motor vehicle. The motor vehicle may include a propulsion apparatus and an ignition system. The ignition system may include a receptor for an ignition control key, and be configured to operate in an on state or an off state. When in the on-state, the ignition system may provide electric power for operation of the propulsion apparatus. When in the off state, the ignition system may withhold electric power from the propulsion apparatus.

In some embodiments, the motor vehicle may be equipped with a multi-point immobilization component (immobilizer), a starter, an engine control unit (ECU), and a fuel pump. The immobilizer may be configured to disable, deactivate, or power down one or more critical components of the motor vehicle using encrypted communication between various units. In some embodiments, the immobilizer may be configured to immobilize the motor vehicle by deactivating the starter, the ECU power, and/or the fuel pump of the motor vehicle via encrypted signals sent to those units.

In some embodiments, the vehicle security system may include an RFID component that is configured to authenticate user's RFID tags.

In some embodiments, the vehicle security system may include an ignition security module. The ignition security module may include a hardwired receiver for receiving an ignition state change signal from various compliments, such as the immobilizer. The ignition state change signal may identify a change in ignition state between the on state and the off state.

In some embodiments, the vehicle security system may be configured so that the system does not use a wireless receiver to detect ignition state. For example, the vehicle security system may be configured to detect the ignition state via signals that pass through a physical conductor (i.e., hardwired).

In some embodiments, the vehicle security system may include a security code receiver that is responsive to an ignition state-change signal. The ignition state-change signal may indicate a change from the off state to the on state and may include a security code. The security code receiver may be configured to receive a security code from a component (such as an RFID tag) in physical proximity of the security module and determine the validity of the received security code. The security code may be a password, passcode, passkey, keycode, authentication key, a pseudorandom alphanumeric value generated by both a processor in the component and the security code receiver, etc. In some embodiments, the security code transmitted from the security code receiver or RFID reader to the RFID tag may be different from the security code transmitted from the RFID tag to the security code receiver or RFID reader. For ease of reference, security codes transmitted from the security code receiver or RFID reader to the RFID tag are referred to herein as "passcodes" and security codes transmitted from the RFID tag to the security code receiver or RFID reader are referred to herein as "keycodes" although the codes may be of similar or different format. Either or both of passcodes and keycodes may be any form of password, authentication key, cryptographic key, alphanumeric string, etc. as used herein, the term "RFID tag" refers to any form of component, module, tag, or fob that includes an RFID receiver and transmitter circuit, processor, memory and is configured to perform the operations described herein. In some embodiments, the passcode of the security code receiver or RFID reader may also be used to validate or verify the security code receiver or RFID reader to other complements within the vehicle security system, such as the main board if.

In some embodiments, the vehicle security system may be configured to read the signal from an RFID tag regardless of the state of the car.

In some embodiments, the vehicle security system can read a signal from an RFID tag even if the car is off.

In some embodiments, the vehicle security system does not respond to the ignition state.

In some embodiments a controlling component is configured to change from the off state to the on state in response to a processor (e.g., a processor in a security code receiver) determining that the received security code is valid.

Some embodiments include a controller component that is configured to switch to the off state if no valid received security code is received, wherein the vehicle security system is configured so that the off state is effective to prevent operation of the vehicle.

Some embodiments provide an apparatus and a method for a motor vehicle security system relating to immobilizing a motor vehicle engine.

In some embodiments the vehicle security system may include an engine control unit (ECU) including an ECU processor that is configured for controlling engine operation. In some embodiments, the system may optionally include a pump control unit including a processor configured for controlling the fuel pump, the pump control unit being separate from the ECU and integrally housed with the fuel pump. In some embodiments, the system may include communication links configured to effectively allow communication between the operator data input source and the ECU, as well as between the ECU and other vehicle components. In some embodiments, the ECU processor may be configured to respond to a valid driver verification data input.

FIG. 1 illustrates an example main printed circuit board (PCB) assembly 100 (which is sometimes referred to herein as a "main board") that may be included in a vehicle security system that is configured to intelligently immobilize a motor vehicle in accordance with various embodiments. In the example illustrated in FIG. 1, the main PCB assembly 100 includes an input fuse component 102, a car connections and external wire harness component 104, an input power supply component 106 (e.g., 12V to 5V, etc.), fuel pump control component 108, an ECU/ECM control component 110, fuses and input protection component 112, a transceiver component 114 (e.g., RS-485 transceiver, etc.), status light emitting diode (LED) component 116, a controller area network (CAN) transceiver component 118, a microcontroller component 120, and a programming header component 122. In some embodiments, the microcontroller component 120 may be the vehicle security system's main processor, central processing unit (CPU), microprocessor unit (MPU), or arithmetic logic unit (ALU). For ease of description, the main processor, CPU, MPU, ALU, and other types of processors are referred to simply as a "processor" with no intent to exclude any of the various types of processor units from the scope of the claims.

In some embodiments, the main PCB assembly 100 may be equipped or configured with one or more additional input or output (I/O) components 124. These additional I/O components 124 may include a variety of different components, including any or all of an enable/disable ignition relay component, an enable/disable fuel pump relay component, an enable/disable engine computer power relay component, a door sensor component (e.g., a sensor or receiver configured to receive sensor data), a hood sensor component, a trunk sensor component, an ignition sensor component, diagnostic light emitting diodes (LEDs), communication LEDs, and/or any other similar I/O capable component.

In some embodiments, the main PCB assembly 100 may be configured to operate as a central "brain" of the vehicle security system. In some embodiments, the main PCB assembly 100 may be configured to process and manage all communications between the components in the vehicle security system.

In various embodiments, the main PCB assembly 100 may be configured to cause an RFID reader (e.g., the RFID reader 200 illustrated in FIG. 2) to interrogate an RFID tag (e.g., the RFID tag 400 illustrated in FIG. 4) in response to or as part of detecting that the RFID tag is in close physical proximity (e.g., 0.25 inches, 1 inch, 3 inches, 6 inches, 1 foot, 3 feet, etc.) to the RFID reader. For example, an RFID reader may detect the presence of an RFID tag by transmitting an interrogation message that includes a passcode, and in response receiving a transmission from the RFID tag that includes a keycode that can be used to verify the RFID tag. Such a response transmission will only be provided by the RFID tag if it is in close proximity to the RFID reader, and the transmission in response may include the keycode that enables the RFID reader (or main board) to verify the RFID tag. Thus, detecting the presence and verifying the RFID tag may be accomplished by transmitting a single interrogation message and analyzing a received response message.

In some embodiments, the main PCB assembly 100 may be a custom PCB that is manufactured, produced, arranged or configured so that all of its components fit within a water-and-dust-proof enclosure. The water-and-dust-proof enclosure may be designed to reduce or minimize the size or the total foot print of the main PCB assembly.

In some embodiments, main PCB assembly 100 may include cabling, hardwires, communication links, and/or interfaces to one or more components in the motor vehicle. For example, the main PCB assembly 100 may include an interface for communicating with the engine computer (or other similar component in the motor vehicle) and requesting that the engine or engine computer enter a power-off state. As another example, the main PCB assembly 100 may include an interface for communicating with a starter board (e.g., the starter board assembly 300 illustrated in FIG. 3) so as to disable the motor vehicle starter circuit.

In some embodiments, the main PCB assembly 100 may be configured to communicate with the RFID reader and/or the starter board via an encrypted I2C hardwired link.

In some embodiments, the main PCB assembly 100 and/or the microcontroller component 120 may be a critical or controlling component of the motor vehicle. In some embodiments, the main PCB assembly 100 and/or the microcontroller component 120 may control the activation and deactivation of the critical or controlling components of the motor vehicle.

Figure 2:
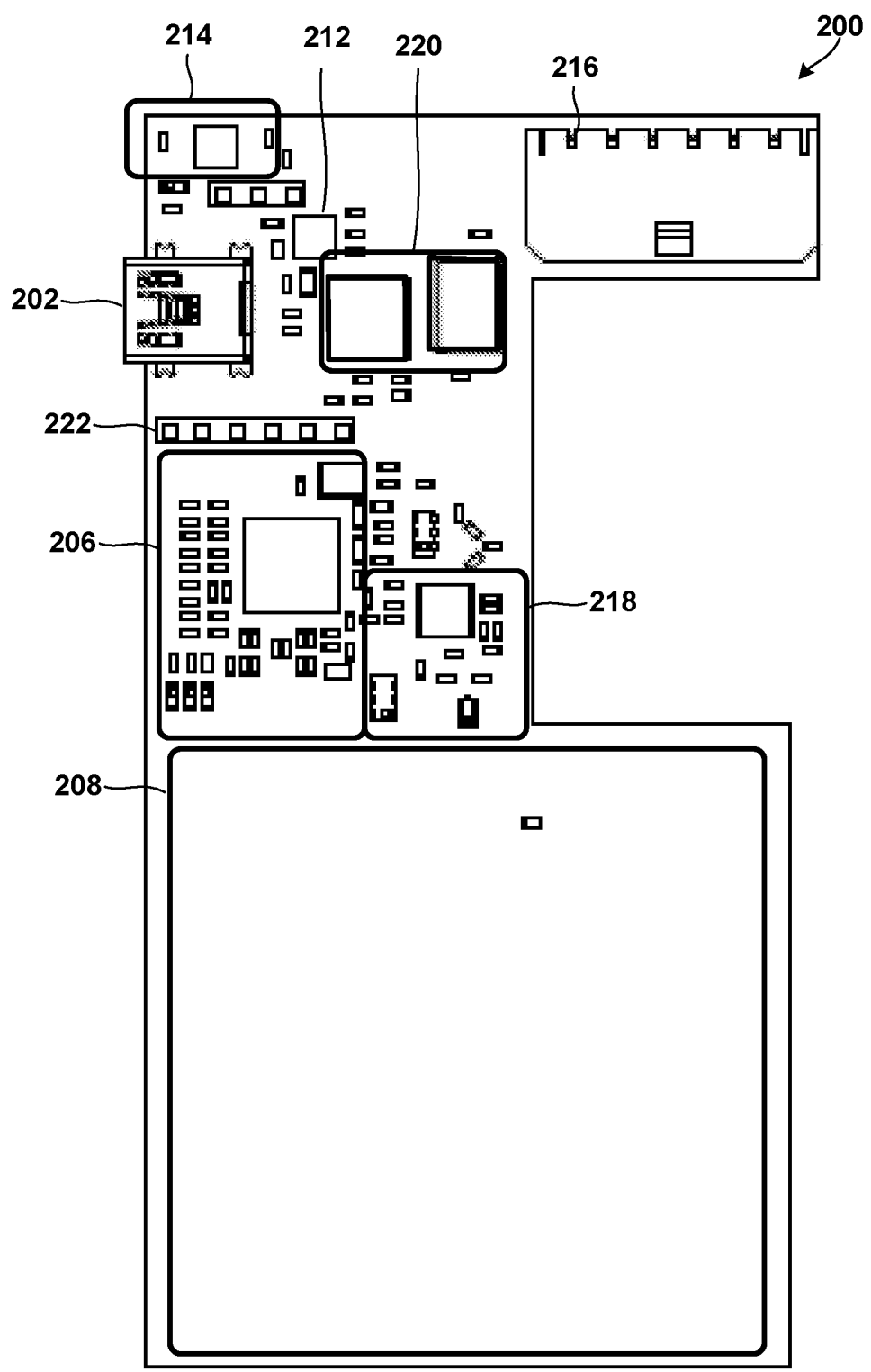
FIG. 2 is a block diagram illustrating components of a radio frequency identification (RFID) reader of a vehicle security system that is configured to provide security for a motor vehicle and intelligently immobilize the motor vehicle in accordance with various embodiments.

FIG. 2 illustrates an example RFID reader 200 of a vehicle security system in accordance with various embodiments. In the example illustrated in FIG. 2, the RFID reader 200 includes a universal serial bus (USB) debug header component 202, a programming header component 222, an RFID engine component 206, an antenna component 208, transceiver component 214, a power supply component 212 (e.g., 5V to 3.3V, etc.), a microcontroller component 220, a wiring harness component 216, and a radio frequency amplifier component 218.

In some embodiments, the RFID reader 200 may be configured to communicate with a main board (e.g., main PCB assembly 100 illustrated in FIG. 1) via an encrypted I2C hardwired communication link.

In some embodiments, the RFID reader 200 may be a custom designed PCB that is suitable for inclusion in a molded enclosure. A motor vehicle operator, customer, or user may place an RFID tag (e.g., the RFID tag 400 illustrated in FIG. 4) in close physical proximity to the RFID reader 200 to disable or disarm the vehicle security system. In some embodiments, the RFID reader 200 may be manufactured, produced, arranged or configured so that it can be installed and hidden within the interior of a motor vehicle at a location specified by the motor vehicle operator or owner. In some embodiments, the RFID reader 200 may be manufactured, produced, arranged or configured so that it is sufficiently thin or narrow so as to reduce or minimize the size or build up when it is positioned under the head liner of the motor vehicle. In some embodiments, the RFID reader 200 may be included as part of the main PCB assembly. In some embodiments, the RFID reader 200 may be configured to send and receive commands, instructions, and communication messages to and from the main PCB assembly 200 illustrated in FIG. 1.

In some embodiments, the antenna component 208 of the RFID reader 200 may be configured to transmit and receive RF modulated signals of a frequency monitored and used by the RFID tag. One or more receive units (e.g., receiver circuitry) in RFID reader 200 may condition (e.g., filter, amplify, down convert, etc.) the received RF modulated signal, digitize the conditioned signal, and provide samples to a demodulator. The demodulator may extract the original information-bearing signal from the modulated carrier wave, and may provide the demodulated signal to a processor (e.g., microcontroller component 220). The processor may de-interleave and/or decode the received signal to obtain the original, decoded data, and may send the decoded data to other components in the vehicle security system. Operations of the transmitter and the receiver may be controlled by the transceiver component 214 and/or the microcontroller component 220. In various embodiments, each of the transmitter and receiver may be implemented as circuitry that may be separated from their corresponding receive and transmit circuitries. Alternatively, the transmitter and the receiver may be respectively combined with corresponding receive circuitry and transmit circuitry, and included as part of the transceiver component 214.

Figure 3:
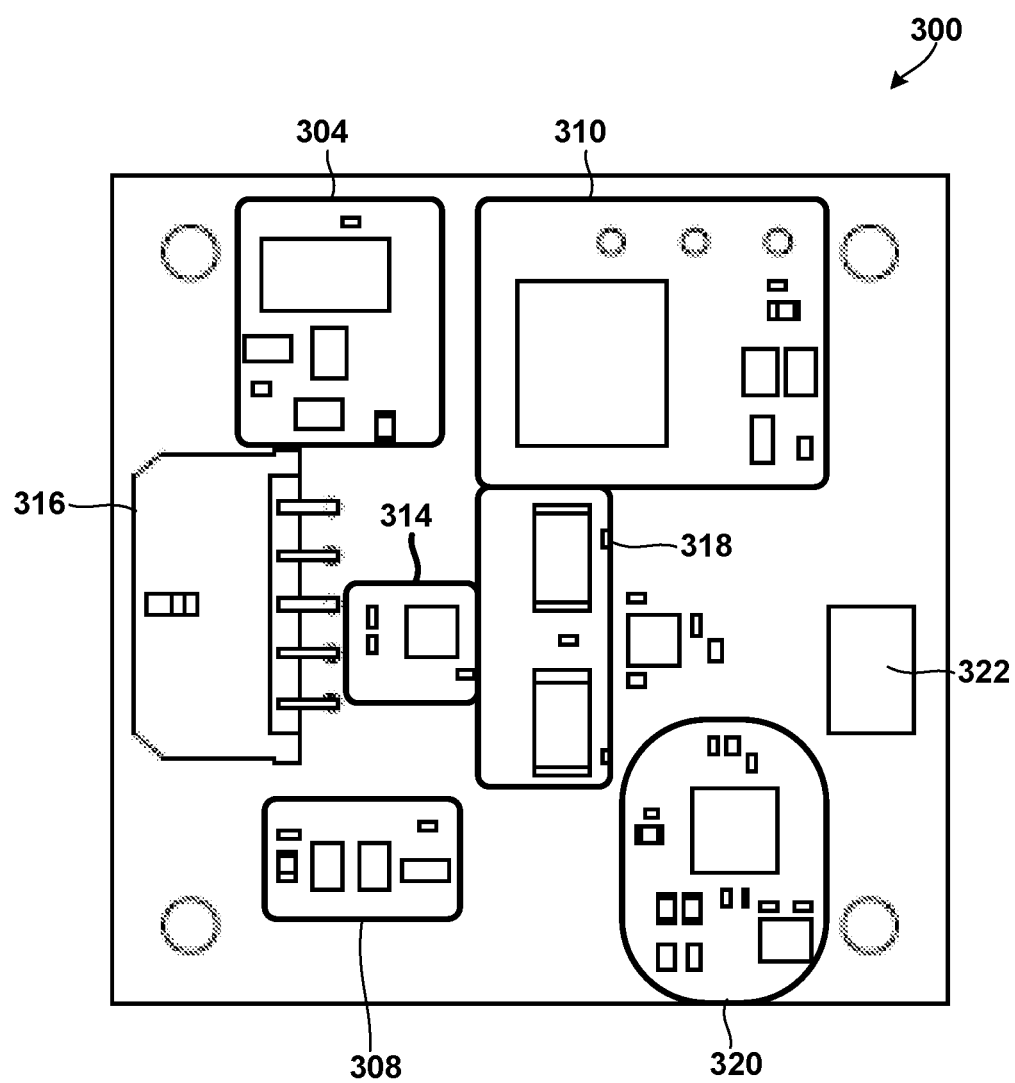
FIG. 3 is a block diagram illustrating components of a starter board assembly or vehicle starter circuit of a vehicle security system that is configured to provide security for a motor vehicle and intelligently immobilize the motor vehicle in accordance with various embodiments.

FIG. 3 illustrates an example starter board assembly 300 of a vehicle security system in accordance with various embodiments. In the example illustrated in FIG. 3, the starter board assembly 300 includes a wiring harness component 316, an input power filtering and fuse component 304, a transceiver component 314, a starter relay control component 308, a starter bypass/control component 310, a CAN transceiver 318, a programming header component 322, and a processor or microcontroller component 320. In some embodiments, the components included in the starter board assembly 300 may be rated for usage up to a select temperature (e.g., up to 155° C., etc.).

In some embodiments, the starter board assembly 300 may be a custom designed PCB that is suitable for inclusion in a high temperature, water, and dust resistant enclosure. In some embodiments, the starter board assembly 300 and/or its enclosure may be manufactured, produced, arranged or configured so that it may be placed under the hood of the vehicle and/or attached directly to the starter motor of the motor vehicle. In various embodiments, the starter board assembly 300 may include, or may be connected to, a high current terminal (e.g., for interfacing with a starter, etc.) and/or a temperature sensor.

In some embodiments, the starter board assembly 300 may be configured to communicate with a main board (e.g., main PCB assembly 100 illustrated in FIG. 1) via an encrypted I2C hardwired communication link.

The starter board assembly 300 may be included as part of an ignition system, a propulsion system, an engine control system, a fuel pump control system, or any other component or subsystem of a motor vehicle.

Figure 4:
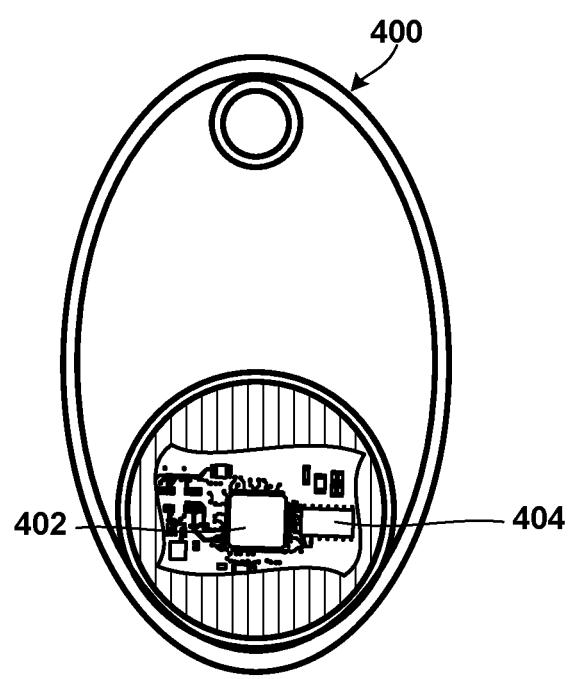
FIG. 4 is an illustration of an RFID tag that is suitable for use with the vehicle security system in accordance with various embodiments.

FIG. 4 illustrates an example RFID tag 400 that may be configured to securely communicate with an RFID reader (e.g., the RFID reader 200 illustrated in FIG. 2) in accordance with various embodiments. In various embodiments, the RFID tag 400 may be an active tag or a passive tag. For example, in some embodiments, the RFID tag 400 may be an active tag or a powered RFID tag that includes a battery and uses battery-power to continuously broadcast its own signal. In other embodiments, the RFID tag 400 may be a passive tag, which is a well-known type of RFID tag that is powered by rectifying electromagnetic radiation (RF) received from the RFID reader.

In some embodiments, the RFID tag 400 may be configured for encrypted two-way communications with an RFID reader. In some embodiments, the RFID tag 400 may be pre-programed with passcodes that are suitable for authenticating the RFID reader and/or the main board, as well as with a keycode to be transmitted to enable authentication of the RFID tag by the RFID reader. In some embodiments, the main board may be pre-programed with passcodes for communicating with the RFID tag 400 (e.g., to request an authentication keycode) and with a keycode for authenticating the RFID tag 400.

The RFID tag 400 may include an RFID tag processor 402 and a secure memory 404 that stores the passcode data so that the keycode can only be accessed using or upon receiving a valid passcode. For example, the secure memory 404 may store a passcode that is unique to if a specific vehicle security system.

The RFID tag 400 may be interrogated by the RFID reader when within communication range. For example, the RFID tag 400 may be configured to receive a communication signal or authentication information (i.e., a passcode) from the RFID reader. The RFID tag 400 may be configured to allow access to the secure memory 404 only when the received information (i.e. passcode) matches a passcode that is stored in the secure memory of the RFID tag 400 (e.g., the secure memory 404). That is, in some embodiments, the secure memory 404 of the RFID tag 400 may not be accessed without receipt of the proper passcode. This may serve to prevent unauthorized users, or scammers, from gaining access to or copy the secure memory 404 or the secure memory data to control the vehicle security system without authorization.

In response to determining that information (i.e., passcode) received from the RFID reader matches the passcode that is stored in its secure memory, the RFID tag 400 may retrieve and send a keycode to the RFID reader, which may provide the received keycode to the main board of the vehicle security system (e.g., PCB assembly 100 illustrated in FIG. 1).

The main board of the vehicle security system may be configured to authenticate or validate the RFID tag 400 based on the received keycode. For example, the main board may be configured to receive the keycode from the RFID tag 400, compare the received keycode to an authentication key or other keycode information that is stored in one of its local memories, and determine whether the RFID tag 400 is valid based on the result of the comparison (e.g., when the received keycode and a stored keycode match, etc.). In response to determining that the RFID tag 400 is valid, the main board of the vehicle security system may perform various operations to cause the vehicle security system to transition from an armed, passive arm, triggered, or running state into a disarmed state.

To provide further security, in some embodiments, the RFID tag 400 may be configured so that only a random sub-section of keycode stored in the secure memory 404 is accessed after receiving the correct passcode from the RFID reader. This may prevent hackers and thieves from gaining access to the vehicle security system by intercepting and recording the information that is communicated between the RFID reader and the RFID tag 400. In these embodiments, each time the RFID tag 400 is interrogated by the RFID reader, a different sub-section of the keycode in secure memory 404 is accessed and transmitted in the response message to enable authentication of the RFID tag by the RFID reader (or mainboard). The main board of the vehicle security system may determine the sub-section using a rolling, random code generator (or a sequentially revolving code generator), and request that the RFID tag 400 send information from the determined sub-section. The main board may be configured to cause the vehicle security system to enter the disarmed state only when the information stored in the determined sub-section of the secure memory 404 of the RFID tag 400 (received from the RFID tag via the RFID reader) matches the data stored in a corresponding sub-section in a local memory of the main board.

For example, the RFID tag 400 may store a keycode (e.g., ABC123456789, etc.) in the secure memory 404, which may be accessed only when the correct passcode (e.g., AllowAccess6#, etc.) is received from the RFID reader or main board. The main board also stores the passcode and the keycode, and may use a rolling random code generator to select a random sub-section of the keycode (e.g., symbols 2-4, which correspond to "BC1" in the above example etc.). The main board may send the passcode (e.g., AllowAccess6#) and information identifying the selected random sub-section (e.g., symbols 2-4) to the RFID tag 400 in a wireless signal. The RFID tag 400 may receive the wireless signal, extract the passcode and information identifying the selected random sub-section, and compare the received passcode to a passcode stored in its local memory to authenticate the message by determining whether the received and stored passcodes match. If the received and stored passcodes do not match, the RFID tag 400 may ignore the wireless signal and not send a response to the main board. If the received and stored passcodes match, the RFID tag 400 may retrieve and send the requested sub-section of the keycode (e.g., "BC1" in the above example) to the RFID reader or main board of the vehicle security system. The main board may receive and compare the received keycode to information stored in its local memory to determine whether the correct portion of the keycode was received, and deactivate or disable security measures only when the received sub-section of keycode correctly matches the information stored in its memory.

By using the rolling random code generator (or sequentially revolving code generator), the main board may request a different or random sub-section of the keycode each time the RFID tag 400 is read. This reduces the probability that a hacker can gain access to the vehicle security system by intercepting both the passcode and the keycode (e.g., by capturing both the request and response communications), and using the captured information at a later time to unlock or disable the vehicle security system.

Figure 5A:
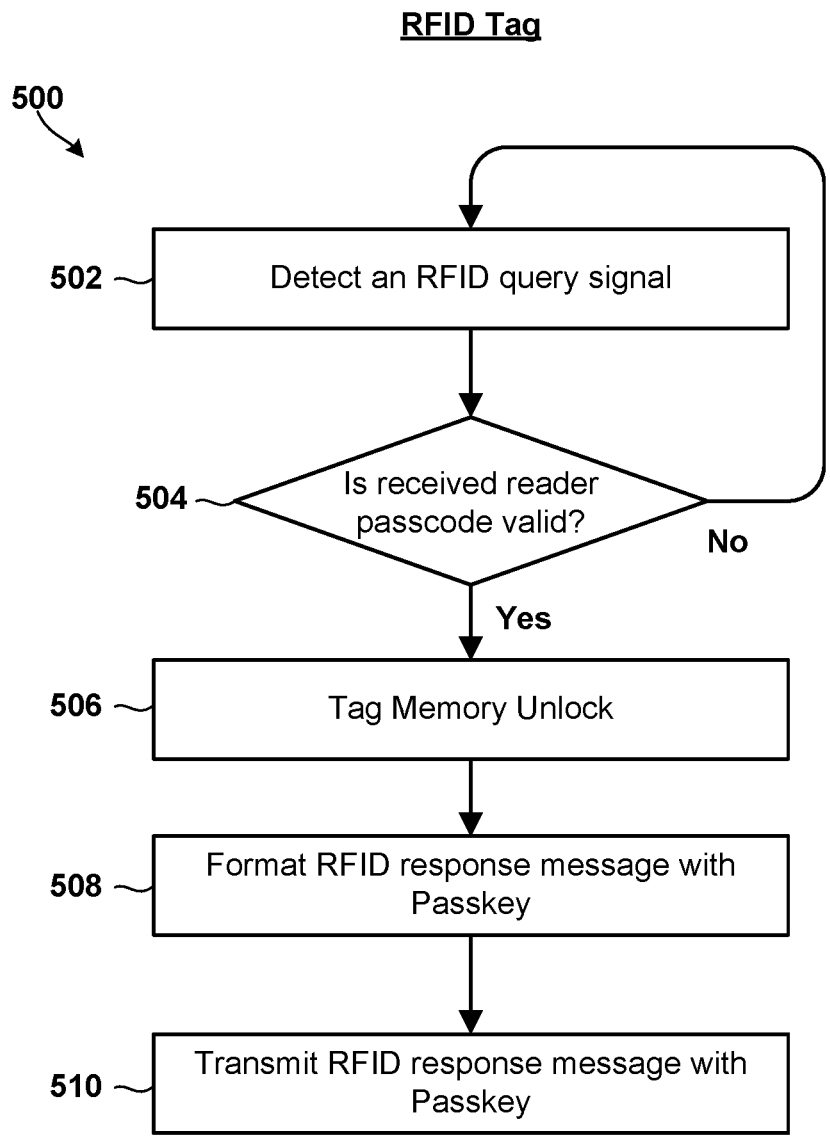
FIGS. 5A and 5B are process flow diagrams illustrating RFID validation and interrogation operations in accordance with various embodiments.

FIG. 5A illustrates a method 500 of operating an RFID tag that is part of the vehicle security system to intelligently immobilize a motor vehicle in accordance with various embodiments. Method 500 may be performed via an RFID tag or a processor, controller or circuitry included therein.

In operation block 502, the RFID tag may detect an RFID interrogation or query signal transmitted. For example, RFID tag may detect radio frequency signals transmitted from an RFID reader that is in close physical proximity to the RFID tag. The RFID tag may use the energy obtained by rectifying the RF signals from the RFID reader to active the tag receiver circuitry, receive the interrogation signal or RFID query signal, extract a passcode from the interrogation or query signal, and perform other operations of the method 500.

In determination block 504, the RFID tag may determine whether the reader passcode included in the received signal is valid. For example, the RFID tag may determine that the passcode is valid in response to determining the received passcode matches a passcode stored in memory. In response to determining that the received reader passcode is not valid (i.e., determination block 504="No"), the RFID tag may power down or wait to detect other RFID query signals in operation block 502.

In response to determining that the passcode is valid (i.e., determination block 504="Yes"), the RFID tag may unlock a tag memory in operation block 506. In some embodiments, the tag memory may be a secure memory that may not be accessed without a proper authentication information (e.g., passcode).

In operation block 508, the RFID tag may generate and/or format an RFID response message that includes all or portions of a keycode stored in the tag memory (e.g., secure memory 404 illustrated in FIG. 4). In operation block 510, the RFID tag may transmit or send the RFID response message to the RFID reader or main board.

Figure 5B:
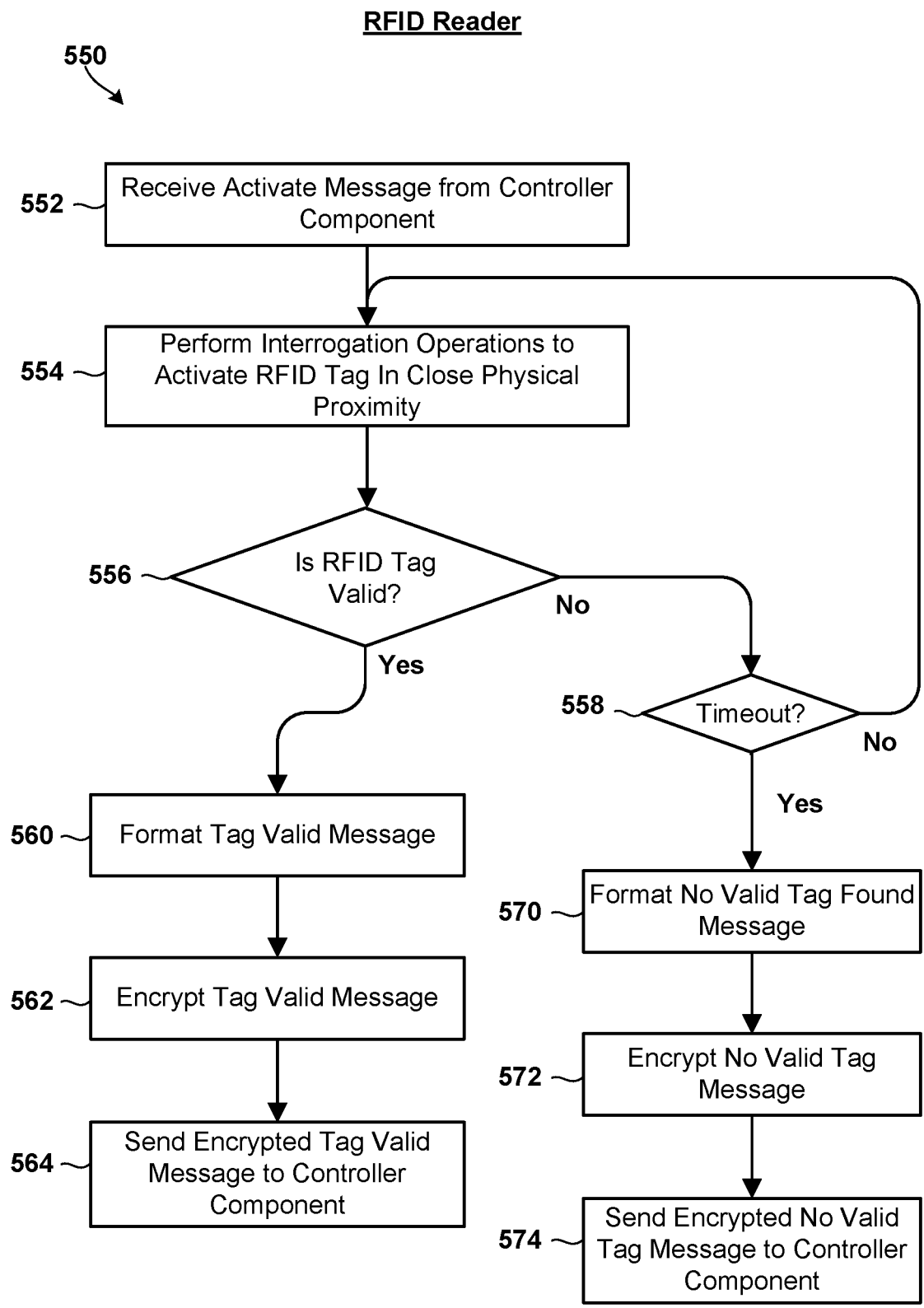

FIG. 5B illustrates a method 550 of operating an RFID reader (or RFID reader) that is part of the vehicle security system in accordance with various embodiments. Method 550 may be performed via an RFID reader or a processor, controller or circuitry included therein. For example, any or all of the operations in method 550 may be performed by the microcontroller component 220 in RFID reader 200, RFID engine component, etc.

In operation block 552, the RFID reader may receive an activate message from the main board of the vehicle security system (e.g., PCB assembly 100 illustrated in FIG. 1). The activate message may be received when (or include information that indicates that) the proper activation sequence (e.g., door opened and closed, ignition start key pressed) was detected by the main board. In some embodiments, the activate message may include the passcode that the RFID reader should include in the interrogation requiring message.

In operation block 554, the RFID reader may perform interrogation operations to activate a RFID tag that is in close physical proximity to the RFID reader. In some embodiments, the RFID reader may activate the RFID tag by generating and sending a RFID interrogation or query signal to the RFID tag. In some embodiments, the RFID query signal may include a passcode, a passkey, information identifying a portion of the passkey, information identifying a selected random sub-section of memory, and/or other similar information. In some embodiments, the passcode included in the interrogation or query signal is received by the RFID reader from the main board as part of the activate message. In some embodiments, the passcode included in the interrogation or query signal is retrieved from memory of the RFID reader.

As part of the interrogation operations, the RFID reader may receive an RFID response message from the RFID tag that includes a tag identifier (ID) and/or a keycode that is unique to the RFID tag.

In determination block 556, the RFID reader may determine whether the RFID tag is valid or authorized. In some embodiments, the RFID reader may determine that the RFID tag is valid in response to determining that a passkey included in the received RFID response message matches a passkey stored in memory. In some embodiments, the RFID reader may determine that the RFID tag is valid in response to determining that an identifier included in the received RFID response message matches an identifier included in the list of valid tags.

In response to determining that the RFID tag is not valid (i.e., determination block 556="No"), the RFID reader may determine whether the system has timed out in determination block 558. For example, the RFID reader may determine whether a time limit associated with finding a valid RFID tag has been exceeded in determination block 556.

In response to determining that the RFID tag is valid (i.e., determination block 556="Yes"), the RFID reader may generate and/or format a Tag Valid Message in operation block 560. The Tag Valid Message may include the tag identifier (e.g., RF Tag ID) and the keycode. In operation block 562, the RFID component may encrypt the Tag Valid Message. In operation block 564, the RFID component may send the encrypted Tag Valid Message to a controller component (e.g., main PCB assembly 100 illustrated in FIG. 1).

In response to determining that the system has not timed out (i.e., determination block 558="No"), the RFID reader may resume performing interrogation operations to activate or energize other RFID tags that are moved into close physical proximity to the RFID reader in operation block 552.

In response to determining that the system has timed out (i.e., determination block 558="Yes"), the RFID reader may generate and/or format a No Valid Tag Found Message in operation block 570. In operation block 572, the RFID component may encrypt the No Valid Tag Found Message. In operation block 574, the RFID component may send the encrypted No Valid Tag Found Message to a controller component (e.g., main PCB assembly 100 illustrated in FIG. 1).

In embodiments in which the RFID reader merely sends the received keycode of the RFID tag to the main board for verification, the main board may determine the validity of the RFID tag by comparing the received keycode to a keycode stored in memory of the main board. In such embodiments, the operations in blocks 556 through 574 may not be performed by the RFID reader.

Figure 6:
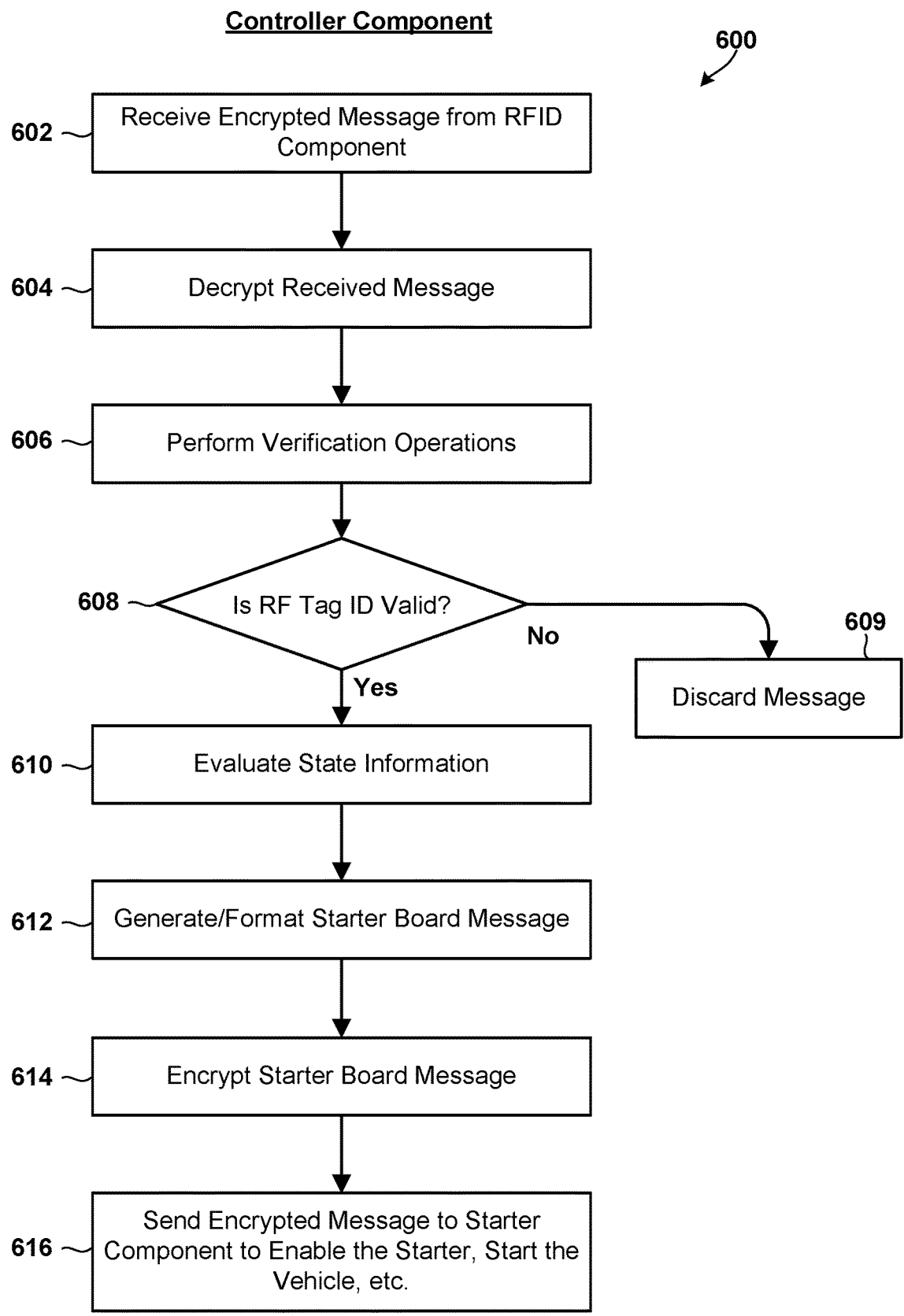
FIGS. 6 through 8 are process flow diagrams illustrating multi-component immobilization methods for providing security for a motor vehicle in accordance with various embodiments.

FIG. 6 illustrates a method 600 of operating the vehicle security system to intelligently immobilize a motor vehicle in accordance with various embodiments. Method 600 may be performed via a controller component or a processor, controller or circuitry included within the main board. For example, any or all of the operations in method 600 may be performed by a main PCB assembly, ECU/ECM control component, microcontroller component, processor etc. for ease of reference, such compliments may be referred to simply as a "processor" in the following descriptions and the claims.

In operation block 602, the controller component may receive an encrypted message from an RFID reader. For example, the encrypted message may be a data indicating that the RFID tag has been verified by the RFID reader as described with reference to FIG. 5. In some embodiments, the controller component may receive an encrypted message including the keycode received by the RFID reader from the RFID tag.

In operation block 604, the controller component may decrypt the received message. In some embodiments, the controller component may perform verification operations in operation block 606. For example, the controller component may authenticate or validate the RFID component based on a passcode that is included in the received and decrypted message. In some embodiments, this may be accomplished by comparing a passcode included in the received message to an authentication key or other passcode information that is stored in a local memory of the controller component.

In determination block 608, the controller component may determine whether the passcode is valid (or the RFID tag keycode in embodiments in which the main board authenticates the RFID tag). This may be accomplished by comparing the passcode (or keycode) to a valid passcode or a list of valid passcodes stored in a local memory of the controller component to determine whether the received and stored passcode (or keycode) match.

In response to determining that the passcode (or keycode)—and thus the RFID complement/reader (or the RFID tag)—is not valid (i.e., determination block 608="No"), the controller component may discard or disregard the message in operation block 609. The controller component may then wait to receive another encrypted message from the RFID component/reader.

In response to determining that the is RF tag ID is valid (i.e., determination block 608="Yes"), the controller component may evaluate state information in operation block 610. For example, the controller component may determine whether a vehicle security system is in a disarmed, diagnostic, armed, passive arm, triggered, or running state.

In operation block 612, the controller component may generate and/or format a starter board message. In operation block 614, the controller component may encrypt the starter board message. In operation block 616, the controller component may send the encrypted message to a starter component or other complement of the system or motor vehicle.

Figure 7:
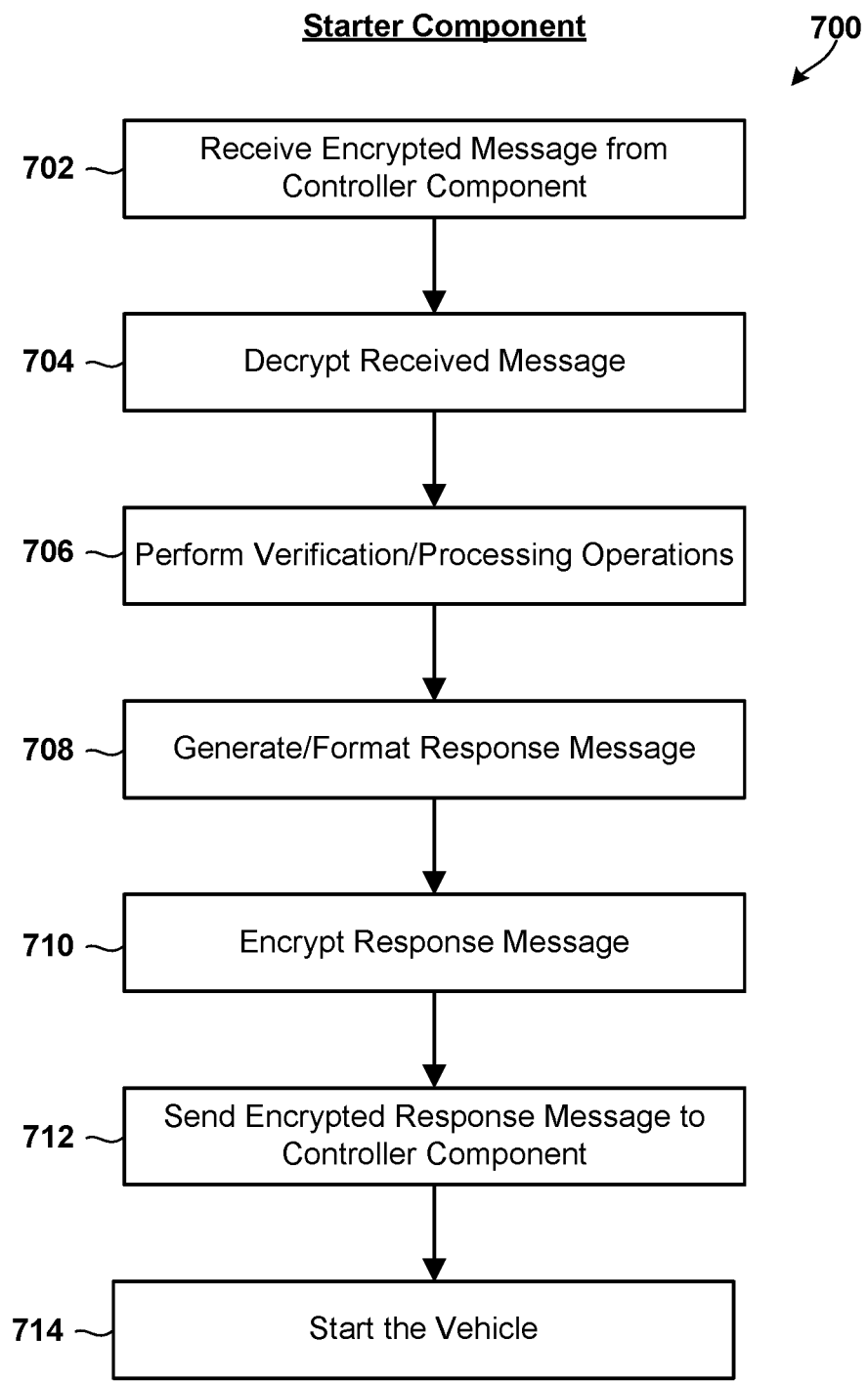

FIG. 7 illustrates a method 700 of operating the vehicle security system to intelligently immobilize a motor vehicle in accordance with various embodiments. Method 700 may be performed via a starter component or a processor, controller or circuitry included therein. For example, any or all of the operations in method 700 may be performed by a starter board assembly, starter relay control component, starter bypass/control component, microcontroller component, or another similar component. Similar operations may also or alternatively be performed by a fuel pump complement or other component that may control or limit operations of the motor vehicle.

In operation block 702, the starter component may receive an encrypted message from the controller component. In operation block 704, the starter component may decrypt the received message. In operation block 706, the starter component may perform verification and/or processing operations to verify that the received message is legitimate or received from the main board.

In operation block 708, the starter component may generate and/or format a response message. In operation block 710, the starter component may encrypt the response message. In operation block 712, the starter component may send the encrypted response message to controller component. In operation block 714, the starter component may start the vehicle in response to a verified message received from the main board.

Figure 8:
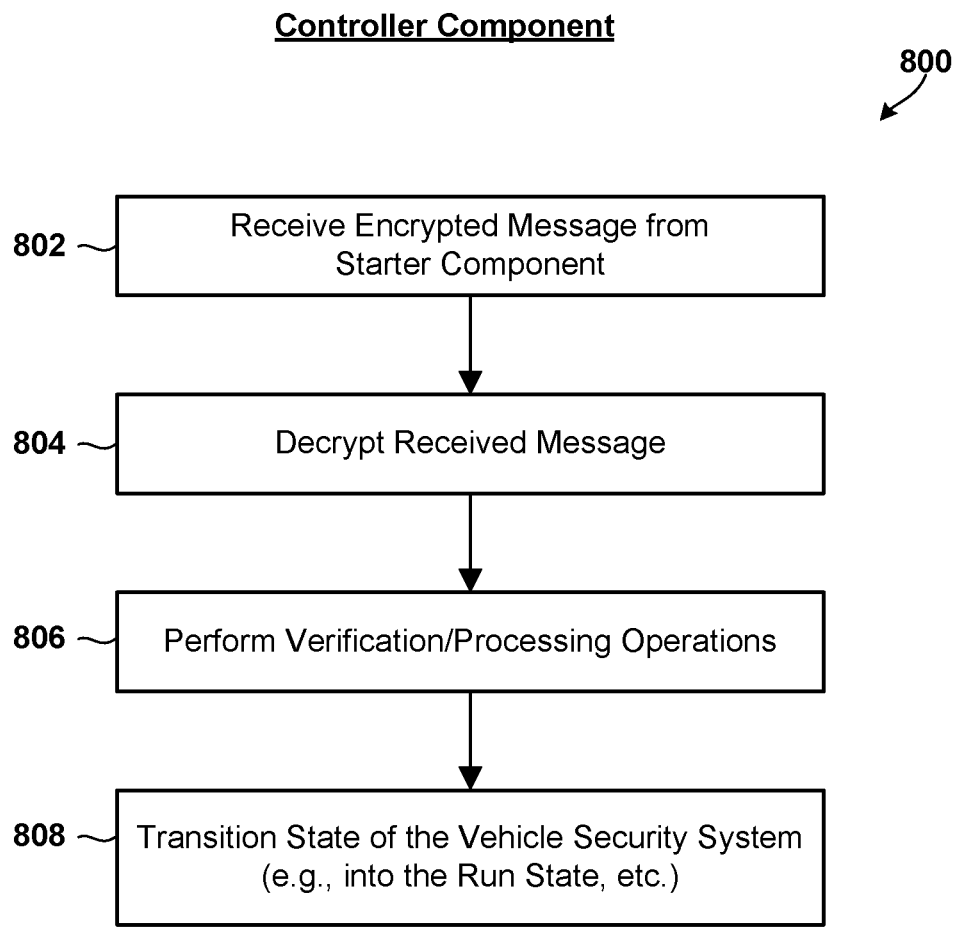

FIG. 8 illustrates a method 800 of operating the vehicle security system to intelligently immobilize a motor vehicle in accordance with various embodiments. Method 800 may be performed via a controller component or a processor, controller or circuitry included therein. For example, any or all of the operations in method 800 may be performed by the main PCB assembly 100, ECU/ECM control component 110 (or main board), microcontroller component 120, 220, 320, a processor, or another similar component.

In operation block 802, the controller component may receive an encrypted message from starter component. In operation block 804, the controller component may decrypt the received message. In operation block 806, the controller component may perform verification/processing operations, such as operations to confirm that a response received from the starter component is a valid acknowledgement. In operation block 808, the controller component may transition the vehicle security system into a different state (e.g., the run state, the disarmed state, etc.). In some embodiments, in operation blocks 806 and 808, the controller component (or main board) may perform any or all of the operations discussed below with reference to FIG. 9A.

Figure 9A:
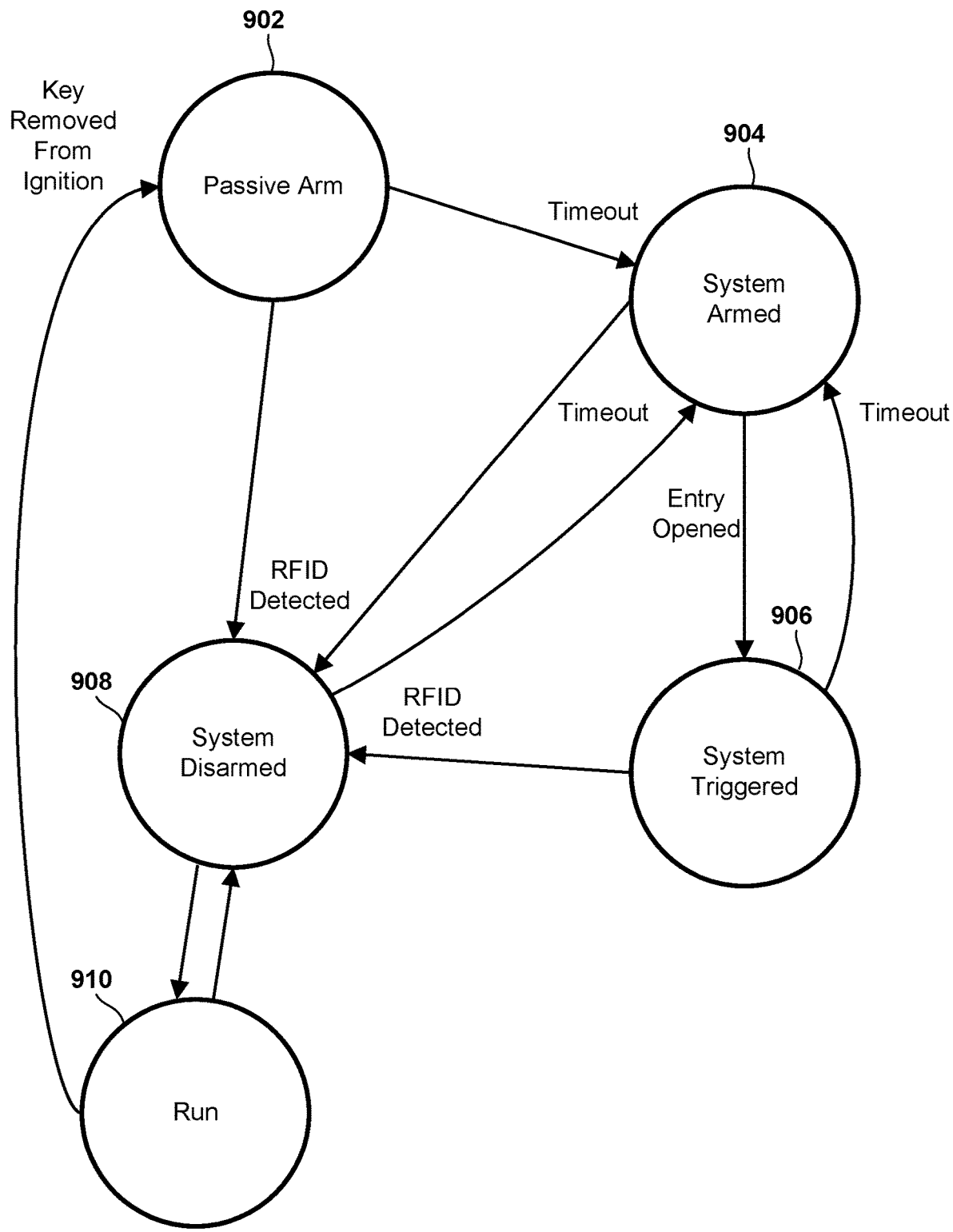
FIG. 9A is a state transition diagram illustrating operations and state transitions in a vehicle security system that is configured to provide security for a motor vehicle and intelligently immobilize the motor vehicle in accordance with various embodiments.

FIG. 9A illustrates various states and state transitions in a vehicle security system that is configured to intelligently immobilize a motor vehicle in accordance with various embodiments.

In a passive arm state 902, the vehicle security system may perform various operations in which the vehicle security system may activate a passive arm state timer, disable outputs (e.g., disable the fuel pump, disable the starter, power down the ECM component, etc.), monitor all door, trunk and hood sensors for inputs, and/or perform other similar operations. In some embodiments, the vehicle security system may enter the passive arm state in response to detecting that a key has been removed from the ignition of the motor vehicle. In motor vehicles in which there is no key, and instead the presence of a wireless fob enables starting by pressing a button, the vehicle security system may enter the passive arm state in response to no longer detecting the presence of the wireless fob.

If after entering the passive arm state 902 the vehicle security system determines that the presence of a valid RFID tag was not detected prior to the passive arm state timer exceeding a passive arm state time value (e.g., 30 seconds, etc.), the vehicle security system may determine that the system has "timed out," and perform various operations to enter a system armed state 904. As part of the operations in the system armed 904, the vehicle security system may disable the fuel pump, disable the starter, power down the ECM component, monitor all door, trunk and hood sensors for inputs, and/or perform other similar operations.

If after entering the system armed state 904 the vehicle security system detects that the door has been opened, the trunk has been opened, the hood has been opened, or that a key has been placed in the ignition and turned, the vehicle security system may perform various operations to enter into a system triggered state 906. As part of these operations 906, the vehicle security system may activate a trigged state timer, disable outputs (e.g., disable the fuel pump, disable the starter, power down the ECM component, etc.), and monitor all door, trunk and hood sensors for inputs.

If after entering the system trigged state 906 the vehicle security system detects the presence of a valid RFID tag prior to the trigged state timer exceeding a trigged state time value (e.g., 30 seconds, etc.), the vehicle security system may determine that the system has "timed out," and perform various operations to reenter the system armed state 904. On the other hand, if the vehicle security system does not detect the presence of a valid RFID tag prior to the trigged state timer exceeding the trigged state time value (e.g., 30 seconds, etc.), the vehicle security system may activate a defense mechanism of the vehicle. For example, the vehicle security system may pulse the horn on and off every second for thirty seconds.

If after entering the passive arm state 902, the system armed state 904, or the system trigged state 906 the vehicle security system determines that a valid RFID tag has been placed in close proximity to an RFID reader, the system may perform various operations to enter into a system disarmed state 908. As part of the operations the system disarmed state 908, the vehicle security system may activate a disarmed state timer, enable outputs (e.g., enable the fuel pump, activate the starter, power up the ECM component, etc.).

If after entering the system disarmed state 908 the vehicle security system determines that a key has not been placed in the ignition and turned prior to the disarmed state timer exceeding a disarmed state time value (e.g., 30 seconds, etc.), the vehicle security system may determine that the system has "timed out," and perform various operations to reenter the system armed state 904. On the other hand, if the vehicle security system determines that a key has been placed in the ignition and turned prior to the disarmed state timer exceeding the disarmed state time value (e.g., 30 seconds, etc.), the vehicle security system may perform various operations to enter into a run state 910. As part of the operations of the run state 910, the vehicle security system may activate a run state timer and enable the outputs (e.g., active the fuel pump and starter, power up the ECM component, etc.).

If after entering the run state 910 the vehicle security system determines that the key placed in the ignition has been turned to off (or the vehicle has otherwise been turned off), the vehicle security system may perform various operations to enter the passive arm state 902. The vehicle security system may remain in the run state until the ignition is turned to off.

Figure 9B:
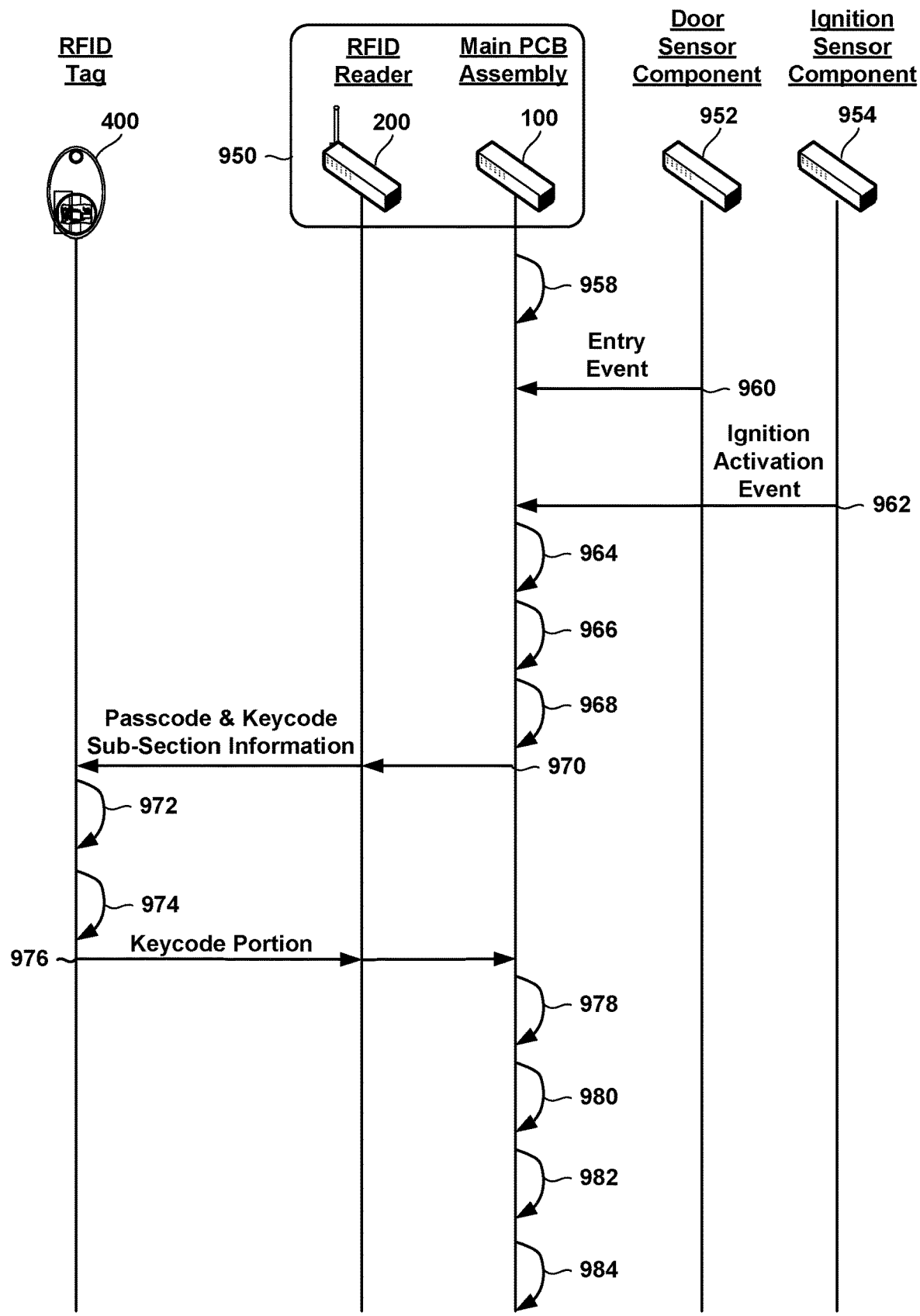
FIG. 9B is a message flow diagram illustrating operations and communications in a vehicle security system that is configured to provide security for a motor vehicle and intelligently immobilize the motor vehicle in accordance with various embodiments.

FIG. 9B illustrates operations and communications in a vehicle security system 950 that is configured to intelligently immobilize a motor vehicle in accordance with various embodiments. In the example illustrated in FIG. 9B, the vehicle security system 950 includes an RFID reader 200 and a main PCB assembly 100, and is configured to communicate with an RFID tag 400, a door sensor component 952, and an ignition sensor component 954.

For ease of references, the operations of the vehicle security system 950 are described with reference to the main PCB assembly 100 or main board. However, in various embodiments, any or all of the described operations may be performed, in whole or in part, by any component in within the vehicle security system (e.g., within the RFID reader 200, microcontroller component 120, 220, 320, starter board assembly, etc.). In various embodiments, the vehicle security system 950 may be configured to communicate with a starter board assembly, a fuel pump control system, or any other component or system within the motor vehicle.

In operation 958, the main PCB assembly 100 may monitor sensors in a motor vehicle to determine whether an entry event message 960 or an ignition activation event message 962 is received. For example, in the signal 960, the main PCB assembly 100 may receive a signal or communication message from the door sensor component 952 indicating that an entry event occurred (e.g., the car door was recently opened and closed, etc.). As another example, in message 962, the main PCB assembly 100 may receive a communication message from the ignition sensor component 954 indicating that an ignition activation event occurred (e.g., ignition was turned to the on position, etc.).

In operation 964, the main PCB assembly 100 may determine whether a car activation sequence is valid. For example, the main PCB assembly 100 may determine whether the car door was opened prior to the ignition key being moved to the on position.

In response to determining that the car activation sequence is valid, in operation 966, the main PCB assembly 100 may retrieve a passcode and a keycode from memory.

In operation 968, the main PCB assembly 100 may use a sequentially revolving code to select a random sub-section of the keycode.

In message 970, the main PCB assembly 100 may send the passcode and information identifying the selected random sub-section to the RFID tag 400 via a wireless signal, which may be generated, modulated, or demodulated by the RFID Assembly 200.

In operation 972, the RFID tag 400 may receive the wireless signal, extract the passcode and information identifying the selected random sub-section, and compare the received passcode to a passcode stored in its local memory to authenticate the wireless signal by determining whether the received and stored passcodes match. If the passcodes do not match, the RFID tag 400 may ignore the wireless signal and not send a response to the main PCB assembly 100.

If the received and stored passcodes match, the RFID tag 400 may use the keycode sub-section information to retrieve a keycode portion in operation 974.

In message 976, the RFID tag 400 may send the requested sub-section of the keycode (i.e., the retrieved keycode portion) to the main PCB assembly 100 via the RFID Assembly 200.

In operation 978, the main PCB assembly 100 may receive the keycode portion, compare the received keycode portion to information stored in its local memory to determine whether the correct portion of the keycode was received from the RFID tag 400.

In operation 980, the main PCB assembly 100 may determine that the RFID tag is a valid RFID tag in response to determining that the received keycode portion matches information stored in the selected random sub-section.

In operation 982, the main PCB assembly 100 may transition the vehicle security system into a different state. For example, the main PCB assembly 100 may transition the vehicle security system into a disarmed state in operation

982 in response to determining that the RFID tag is a valid RFID tag in operation 980. The main PCB assembly 100 may also deactivate or disable security measures, activate starter board assembly, activate the fuel pump, and/or perform other similar operations to allow the user to start and operate the motor vehicle.

In operation 984, the main PCB assembly 100 may monitor sensors in a motor vehicle to determine whether the ignition system of the vehicle transitioned from an on state to an off state, set a timer in response to determining that the ignition system of the vehicle transitioned from the on state to the off state, determine whether a value of the timer is greater than a threshold value, and enter into an armed state in response to determining that the value of the timer is greater than the threshold value.

Figure 10:
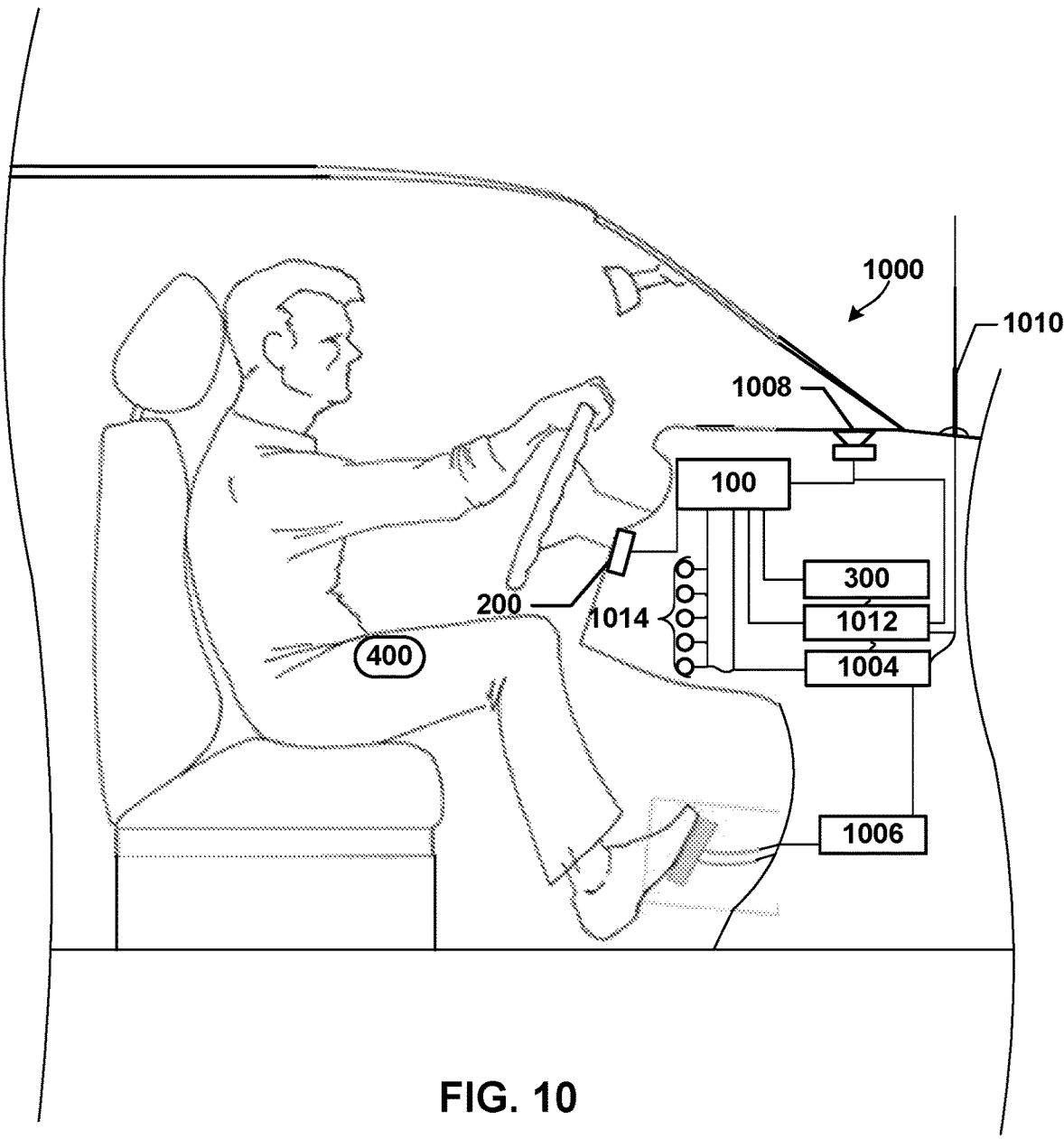
FIG. 10 is a component block diagram illustrating components in a motor vehicle that is equipped with a vehicle security system that is suitable for implementing various embodiments.

FIG. 10 is a component block diagram of an example motor vehicle including a vehicle security system 1000 suitable for implementing various embodiments.

The motor vehicle may include an engine, engine control module (ECM), engine control unit (ECU), an engine control processor, a starter component, an ignition system, a receptor for an ignition control key, a propulsion system, a fuel pump, a pump control unit (PCU), a pump control processor, a radio-frequency identification (RFID) component, a wireless receiver, a hardwired receiver, a controlling component, an operator data input source, and/or other similar components. The motor vehicle may also include circuitry and/or communication links for communicating information between the operator data input source and the ECM/ECU, and between the ECM/ECU and any or all of the other components and systems within the motor vehicle.

The vehicle security system 1000 may include a main PCB assembly 100, an RFID reader 200, a starter board assembly 300, and an RFID tag 400. The vehicle security system 1000 may be, or may include, a motor vehicle security system, a vehicle immobilizer security apparatus, and/or a multi-point immobilization component.

The vehicle security system 1000 may be coupled to a vehicle control system 1004 that is configured to control an engine control system 1012, an ignition control system, a transmission control system, a fuel pump control system, sensors, horn speakers 1008, and a variety of other vehicle systems and subsystems in the motor vehicle. The vehicle control system 1004 and/or the engine control system may be coupled to one or more pedal sensors 1006. The motor vehicle may also include an antenna 1010 suitable for sending and receiving data via a wireless wide-area network, as well as to receive wireless broadcasts. In addition, the motor vehicle may include a mechanical key-in-ignition switch that is built into an ignition control module of the motor vehicle.

Each of the systems, components, and sensors in the motor vehicle may communicate with one or more other systems via one or more communication links, which may include wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The variety of sensors 1014 coupled to the main PCB assembly 100 or the vehicle control system 1004 may include any of the vehicle's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, various fluid sensors (e.g., engine coolant sensor, transmission fluid sensor, etc.), tire-pressure monitoring sensor, mass airflow sensor, speed sensor, blind spot monitoring sensor, parking sensor, cameras, microphones, accelerometers, compasses, GPS receiver, and other similar sensors for monitoring physical or environmental conditions in and around the vehicle.

Figure 11A:
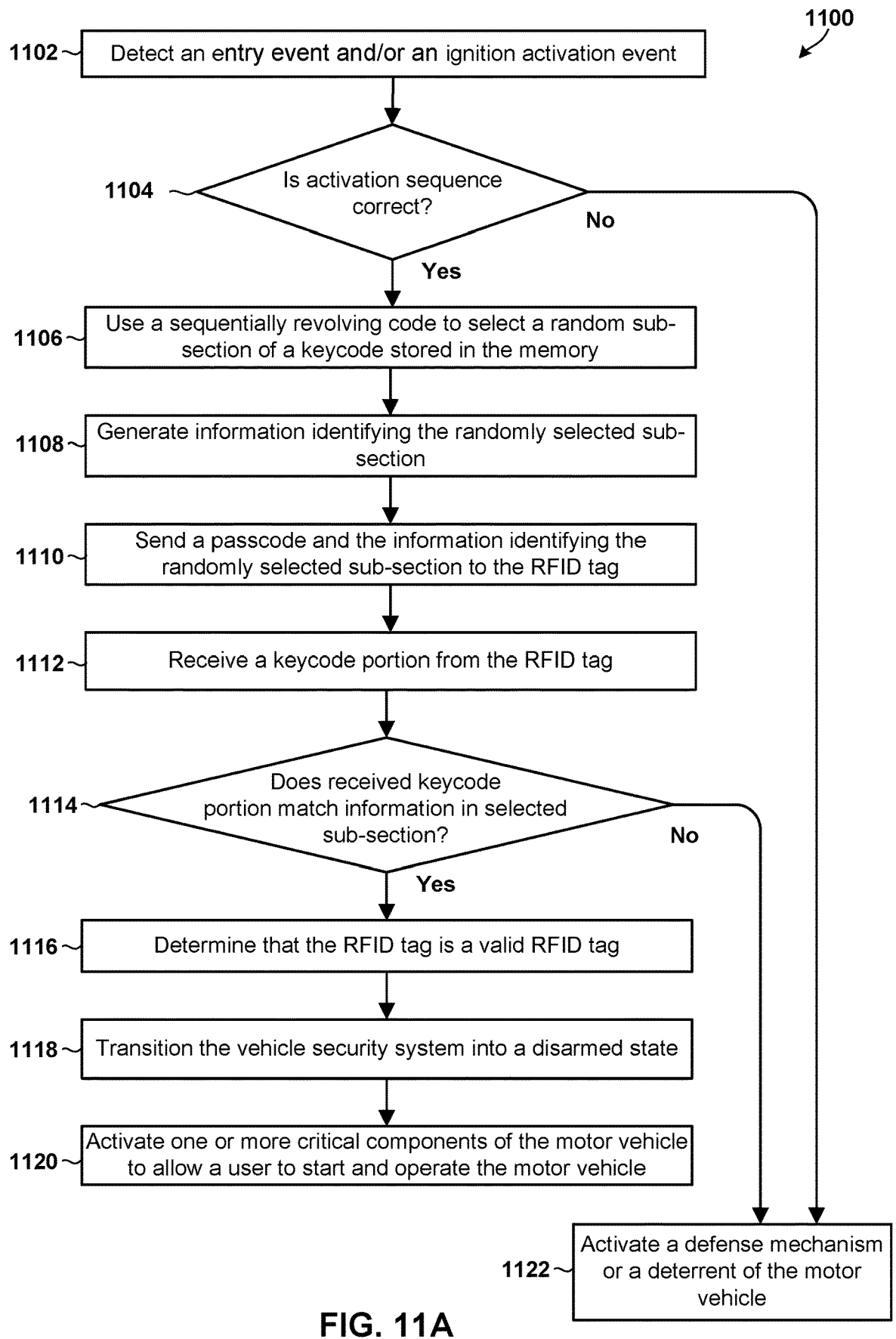
FIGS. 11A and 11B are process flow diagrams illustrating methods of providing security for a motor vehicle and intelligently immobilizing the motor vehicle in accordance with various embodiments.

FIG. 11A illustrates a method 1100 of providing security for a motor vehicle and intelligently immobilizing the motor vehicle in accordance with various embodiments. Method 1100 may be performed by vehicle security device or a component in the vehicle security system (e.g., main PCB assembly 100, microcontroller component 120, 220, 320, etc.).

In operation block 1102, the vehicle security device or component may detect an entry event and/or an ignition activation event. As part of these operations, the vehicle security device or component may monitor sensors in the motor vehicle to determine whether an entry event occurred and monitor an ignition system of the motor vehicle to determine whether an ignition activation event occurred.

In determination block 1104, the vehicle security device or component may determine whether an activation sequence of a motor vehicle is correct. In some embodiments, the vehicle security device or component may determine that the activation sequence of the motor vehicle is correct in response to determining that at least one entry event occurred, that the ignition activation event occurred, and the detected entry event occurred prior to the ignition activation event.

In response to determining that the activation sequence of the motor vehicle is not correct (i.e., determination block 1104="Not"), the vehicle security device or component may activate a defense mechanism or a deterrent of the motor vehicle in operation block 1122.

In response to determining that the activation sequence of the motor vehicle is correct (i.e., determination block 1104="Yes"), the vehicle security device or component may use a sequentially revolving code to select a random sub-section of a keycode stored in a local memory of the vehicle security device or component in operation block 1106.

In operation block 1108, the vehicle security device or component may generate information identifying the selected random sub-section of the keycode.

In operation block 1110, the vehicle security device or component may send a passcode and the information identifying the selected random sub-section of the keycode to the RFID tag.

In operation block 1112, the vehicle security device or component may receive a keycode portion from the RFID tag in response to sending the passcode and the information identifying the selected random sub-section of the keycode to the RFID tag.

In determination block 1114, the vehicle security device or component may determine whether the received keycode portion matches information stored in the selected random sub-section of the keycode.

In response to determining that the received keycode portion does not match the information stored in the selected random sub-section of the keycode (i.e., determination block 1114="No"), the vehicle security device or component may activate a defense mechanism or a deterrent of the motor vehicle in operation block 1122.

In response to determining that the received keycode portion matches information stored in the selected random sub-section of the keycode (i.e., determination block 1114="Yes"), the vehicle security device or component may determine that the RFID tag is valid in operation block 1116.

In operation block 1118, the vehicle security device or component may transition into (or transition the vehicle security system into) a disarmed state to allow the starter assembly to start the motor vehicle without setting off a deterrent or defense mechanism of vehicle security system.

In operation block 1120, the vehicle security device or component may activate one or more critical components of the motor vehicle to allow a user to start and operate the motor vehicle. In some embodiments, the vehicle security device or component may activate one or more critical components as part of the operations for transition into the disarmed state.

Figure 11B:
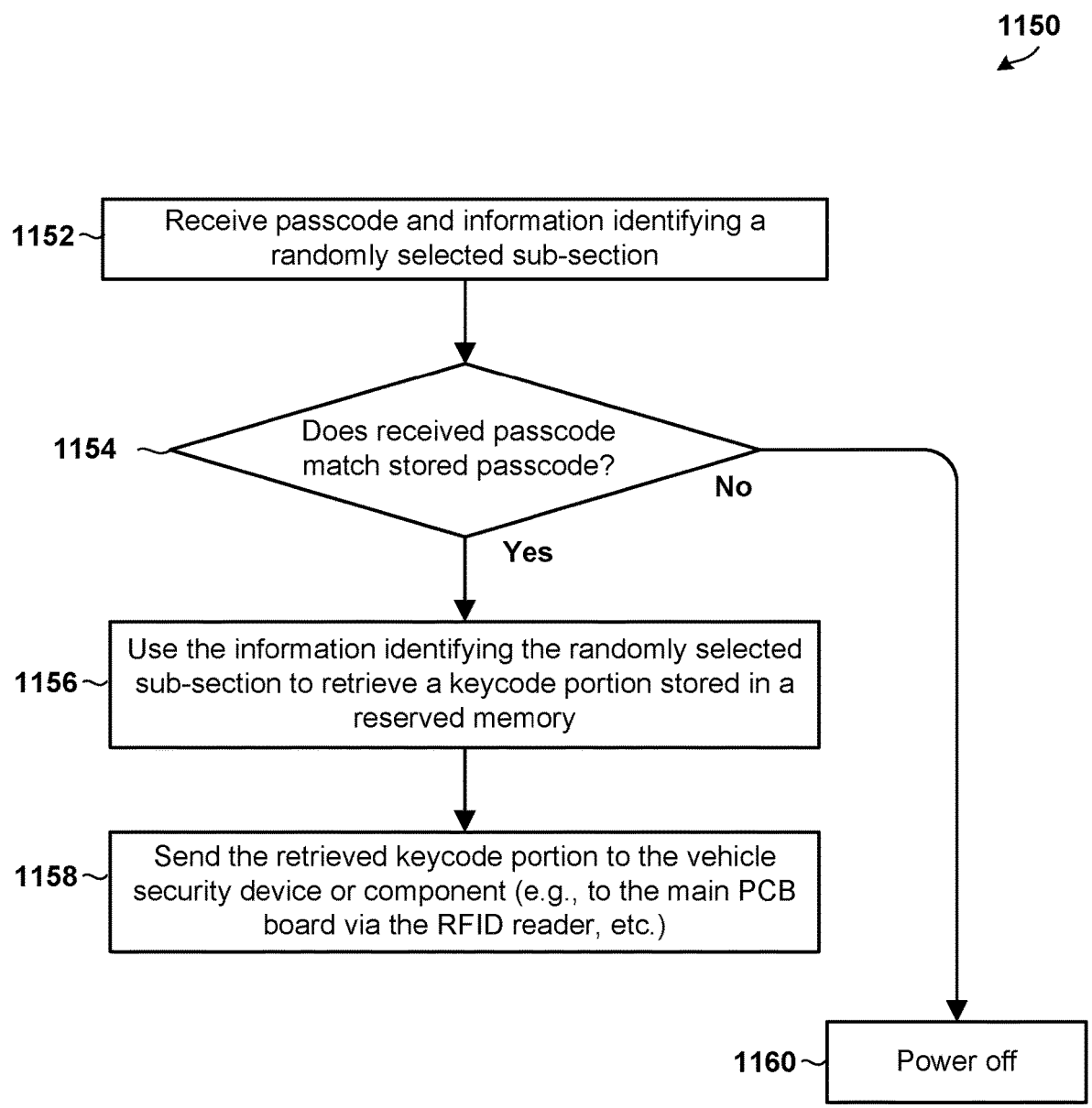

FIG. 11B illustrates a method 1150 of providing security for a motor vehicle in accordance with various embodiments. Method 1150 may be performed by the RFID tag processor 402 of the RFID tag 400.

In operation block 1152, the RFID tag processor 402 may receive a passcode and information identifying a randomly selected sub-section of a keycode from a vehicle security device or a component in the vehicle security system. In determination block 1154, the RFID tag processor 402 may determine whether the received passcode matches a passcode stored in the reserve memory 404 (stored passcode).

In response to determining that received passcode does not match the stored passcode (i.e., determination block 1154="No"), the RFID tag processor 402 may perform various operations to power down the RFID tag 400 in operation block 1160.

In response to determining that received passcode matches the stored passcode (i.e., determination block 1154="Yes"), the RFID tag processor 402 may use the information identifying the randomly selected sub-section to retrieve a portion of a keycode stored in the secure memory 404 (keycode portion) in operation block 1156.

In operation block 1152, the RFID tag processor 402 may send the keycode portion to the vehicle security device or component.

The aforementioned systems are presented merely as examples, and vehicles may include one or more additional systems that are not illustrated for clarity. Additional systems may include systems related additional functions of the vehicular system, including instrumentation, airbags, cruise control, other engine systems, stability control parking systems, tire pressure monitoring, antilock braking, active suspension, battery level and/or management, and a variety of other systems.

The controllers, microcontrollers, and processors discussed in this application may be any programmable microprocessor, microcomputer or multiple processor chip or chips that can be configured by software instructions (applications) to perform a variety of functions, including the functions of various embodiments described in this application. In some systems, multiple processors may be provided, such as one processor dedicated to communication functions and one processor dedicated to running other applications. Typically, software applications may be stored in the internal memory of the system before they are accessed and loaded into the processor. The processor may include internal memory sufficient to store the application software instructions.

The foregoing method descriptions and the process flow diagrams are provided merely as illustrative examples, and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "comparator," "encoder," "element" "system," and the like may include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A vehicle security system, comprising:
 a main printed circuit board (PCB) assembly;
 a radio frequency identification (RFID) reader coupled to the main PCB assembly;
 a starter assembly coupled to the main PCB assembly; and
 an RFID tag,
 wherein the main PCB assembly is configured to:
  determine whether an activation sequence of a motor vehicle is correct by:
   monitoring sensors in the motor vehicle to determine whether an entry event occurred;
   monitoring an ignition system of the motor vehicle to determine whether an ignition activation event occurred;
   determining that at least one entry event occurred;
   determining that the ignition activation event occurred; and
   determining that the at least one entry event occurred prior to the ignition activation event;
  determine whether an RFID tag is in close physical proximity to the RFID reader and whether the RFID tag is valid in response to determining that the activation sequence of the motor vehicle is correct; and
  transition the vehicle security system into a disarmed state to allow the starter assembly to start the motor vehicle in response to determining that the RFID tag is in close proximity to the RFID reader and valid.

2. The vehicle security system of claim 1, wherein the main PCB assembly is further configured to immobilize the motor vehicle by deactivating a critical component of the motor vehicle in response to:
 determining that the activation sequence of the motor vehicle is not correct;
 determining that the RFID tag is not in close physical proximity; or
 determining that the RFID tag is not valid.

3. The vehicle security system of claim 2, wherein the main PCB assembly is configured to deactivate the critical component of the motor vehicle by:
 deactivating a starter motor of the motor vehicle; and
 deactivating a fuel pump of the motor vehicle.

4. The vehicle security system of claim 1, wherein the RFID tag is configured to:
 receive a passcode from the RFID reader;
 determine whether the received passcode matches a stored passcode;
 retrieve a keycode from a secure memory in response to determining that the received passcode matches the stored passcode; and
 send the retrieved keycode to the RFID reader.

5. The vehicle security system of claim 1, wherein the main PCB assembly is configured to determine whether the RFID tag is in close physical proximity to the RFID reader and determine whether the RFID tag is valid by:
 using a sequentially revolving code to select a random sub-section of a keycode stored in a local memory of the main PCB assembly;
 generate information identifying the selected random sub-section of the keycode;
 transmitting an interrogation message including a passcode and the information identifying the selected random sub-section of the keycode to the RFID tag;
 receiving a keycode portion from the RFID tag in response to transmitting the interrogation message;
 determining whether the received keycode portion matches information stored in the selected random sub-section of the keycode; and
 determining that the RFID tag is valid in response to determining that the received keycode portion matches information stored in the selected random sub-section of the keycode.

6. The vehicle security system of claim 5, wherein the RFID tag is configured to:
 receive the passcode and the information identifying the selected random sub-section of the keycode;
 determine whether the received passcode matches a stored passcode;
 use the information identifying the selected random sub-section of the keycode to retrieve a keycode portion stored in a secure memory in response to determining that the received passcode matches the stored passcode; and
 send the retrieved keycode portion to the main PCB assembly via the RFID reader.

7. The vehicle security system of claim 1, wherein the main PCB assembly is further configured to:
 monitor the ignition system of the motor vehicle to determine whether the ignition activation event occurred in response to determining that at least one entry event occurred; and
 determine whether the RFID tag is in close physical proximity to the RFID reader an whether the RFID tag is valid in response to determining that the ignition activation event occurred.

8. The vehicle security system of claim 1, wherein the main PCB assembly is further configured to activate a defense mechanism or a deterrent in response to determining that the activation sequence of the motor vehicle is not correct.

9. The vehicle security system of claim 1, wherein the main PCB assembly is further configured to:
   determine whether an ignition system of the motor vehicle transitioned from an on state to an off state;
   activate a timer in response to determining that the ignition system of the motor vehicle transitioned from the on state to the off state;
   determine whether a value of the timer is greater than a threshold value; and
   enter into an armed state in response to determining that the value of the timer is greater than the threshold value.

10. A vehicle security device, comprising:
   a processor configured with processor executable instructions to:
      determine whether an activation sequence of a motor vehicle is correct by:
         monitoring sensors in the motor vehicle to determine whether an entry event occurred;
         monitoring an ignition system of the motor vehicle to determine whether an ignition activation event occurred;
         determining that at least one entry event occurred;
         determining that the ignition activation event occurred; and
         determining that the at least one entry event occurred prior to the ignition activation event;
      determine whether an RFID tag is in close physical proximity to an RFID reader of the motor vehicle and whether the RFID tag is valid in response to determining that the activation sequence of the motor vehicle is correct; and
      transition into a disarmed state to allow a starter assembly of the motor vehicle to start the motor vehicle in response to determining that the RFID tag is in close proximity to the RFID reader and valid.

11. The vehicle security device of claim 10, wherein the processor is configured to determine whether the RFID tag is in close physical proximity to the RFID reader and whether the RFID tag is valid by:
   using a sequentially revolving code to select a random sub-section of a keycode stored in a local memory of the vehicle security device;
   generate information identifying the selected random sub-section of the keycode;
   transmitting an interrogation message including a passcode and the information identifying the selected random sub-section of the keycode to the RFID tag;
   receiving a keycode portion from the RFID tag in response to transmitting the interrogation message;
   determining whether the received keycode portion matches information stored in the selected random sub-section of the keycode; and
   determining that the RFID tag is valid in response to determining that the received keycode portion matches information stored in the selected random sub-section of the keycode.

12. The vehicle security device of claim 10, wherein the processor is configured to determine whether the activation sequence of the motor vehicle is correct by:
   monitoring sensors in the motor vehicle to determine whether an entry event occurred; and
   monitoring an ignition system of the motor vehicle to determine whether an ignition activation event occurred.

13. The vehicle security device of claim 12, wherein the processor is configured to determine that the activation sequence of the motor vehicle is correct by:
   determining that at least one entry event occurred;
   determining that the ignition activation event occurred; and
   determining that the at least one entry event occurred prior to the ignition activation event.

14. The vehicle security device of claim 10, wherein the processor is further configured to:
   activate a defense mechanism or a deterrent in response to determining that the activation sequence of the motor vehicle is not correct; or
   immobilize the motor vehicle by deactivating a critical component of the motor vehicle in response to:
      determining that the activation sequence of the motor vehicle is not correct;
      determining that the RFID tag is not in close physical proximity; or
      determining that the RFID tag is not valid.

15. A method of providing security for a motor vehicle, comprising
   determining, via a processor in a vehicle security system component, whether an activation sequence of the motor vehicle is correct by:
      monitoring sensors in the motor vehicle to determine whether an entry event occurred;
      monitoring an ignition system of the motor vehicle to determine whether an ignition activation event occurred;
      determining that at least one entry event occurred;
      determining that the ignition activation event occurred; and
      determining that the at least one entry event occurred prior to the ignition activation event;
   determining whether an RFID tag is in close physical proximity to an RFID reader of the motor vehicle and whether the RFID tag is valid in response to determining that the activation sequence of the motor vehicle is correct; and
   allowing a starter assembly of the motor vehicle to start the motor vehicle in response to determining that the RFID tag is in close proximity to the RFID reader and valid.

16. The method of claim 15, further comprising immobilizing the motor vehicle in response to:
   determining that the activation sequence of the motor vehicle is not correct;
   determining that the RFID tag is not in close physical proximity; or
   determining that the RFID tag is not valid.

17. The method of claim 15, wherein determining whether the RFID tag is in close physical proximity to the RFID reader and whether the RFID tag is valid comprise:
   using a sequentially revolving code to select a random sub-section of a keycode stored in a local memory of the vehicle security system component;
   generate information identifying the selected random sub-section of the keycode;
   transmitting an interrogation message including a passcode and the information identifying the selected random sub-section of the keycode to the RFID tag;
   receiving a keycode portion from the RFID tag in response to transmitting the interrogation message;

determining whether the received keycode portion matches information stored in the selected random sub-section of the keycode; and determining that the RFID tag is valid in response to determining that the received keycode portion matches information stored in the selected random sub-section of the keycode.

18. The method of claim 17, further comprising:

receiving, by an RFID tag processor of the RFID tag, the passcode and the information identifying the selected random sub-section of the keycode;

determining, by the RFID tag processor, whether the received passcode matches a stored passcode;

using, by the RFID tag processor, the information identifying the selected random sub-section of the keycode to retrieve a keycode portion stored in a secure memory in response to determining that the received passcode matches the stored passcode; and sending the retrieved keycode portion from the RFID tag to the vehicle security system component.

* * * * *